(12) United States Patent
Baik et al.

(10) Patent No.: US 11,948,249 B2
(45) Date of Patent: *Apr. 2, 2024

(54) BOUNDING BOX ESTIMATION AND LANE VEHICLE ASSOCIATION

(71) Applicant: QUALCOMM Incorporated, San Diego, CA (US)

(72) Inventors: Young-Ki Baik, Namyangju-si (KR); ChaeSeong Lim, Seoul (KR); Duck Hoon Kim, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,101

(22) Filed: Oct. 7, 2022

(65) Prior Publication Data
US 2023/0135153 A1 May 4, 2023

Related U.S. Application Data

(63) Continuation of application No. 16/733,231, filed on Jan. 2, 2020, now Pat. No. 11,494,979.

(60) Provisional application No. 62/788,744, filed on Jan. 4, 2019.

(51) Int. Cl.
*G06T 17/10* (2006.01)
*G05D 1/00* (2006.01)
*G06T 7/70* (2017.01)
*G06T 7/73* (2017.01)

(52) U.S. Cl.
CPC ............ *G06T 17/10* (2013.01); *G05D 1/0238* (2013.01); *G05D 1/0251* (2013.01); *G06T 7/70* (2017.01); *G06T 7/75* (2017.01); *G06T 2207/10016* (2013.01); *G06T 2207/20084* (2013.01); *G06T 2207/30256* (2013.01); *G06T 2207/30261* (2013.01); *G06T 2210/12* (2013.01)

(58) Field of Classification Search
CPC .. G06T 17/10; G06T 7/70; G06T 7/75; G06T 2207/30256; G06T 2207/20084; G06T 2210/12; G06T 2207/30261; G06T 2207/10016; G06T 7/12; G05D 1/0251; G05D 1/0238; B60W 40/04
USPC ........................................................ 382/154
See application file for complete search history.

(56) References Cited

U.S. PATENT DOCUMENTS

| | | | |
|---|---|---|---|
| 5,680,523 A * | 10/1997 | Watkins | G06T 15/20 345/419 |
| 10,304,191 B1 | 5/2019 | Mousavian et al. | |
| 2015/0302611 A1 | 10/2015 | Fan et al. | |
| 2017/0270374 A1 | 9/2017 | Myers et al. | |
| 2019/0147600 A1* | 5/2019 | Karasev | G06T 7/62 382/107 |
| 2020/0082560 A1 | 3/2020 | Nezhadarya et al. | |
| 2020/0086789 A1* | 3/2020 | Nowakowski | B60R 1/00 |
| 2020/0219315 A1 | 7/2020 | Baik et al. | |

(Continued)

*Primary Examiner* — Stephen P Coleman
(74) *Attorney, Agent, or Firm* — Muncy, Geissler, Olds & Lowe, P.C./Qualcomm Incorporated

(57) ABSTRACT

Disclosed are techniques for estimating a 3D bounding box (3DBB) from a 2D bounding box (2DBB). Conventional techniques to estimate 3DBB from 2DBB rely upon classifying target vehicles within the 2DBB. When the target vehicle is misclassified, the projected bounding box from the estimated 3DBB is inaccurate. To address such issues, it is proposed to estimate the 3DBB without relying upon classifying the target vehicle.

20 Claims, 36 Drawing Sheets

(56) References Cited

U.S. PATENT DOCUMENTS

2020/0219316 A1 7/2020 Baik
2020/0349365 A1 11/2020 Behrendt
2023/0112799 A1 4/2023 Baik et al.

* cited by examiner

BOUNDING BOX ESTIMATION AND LANE VEHICLE ASSOCIATION

CROSS-REFERENCE TO RELATED APPLICATION

The present Application for Patent is a continuation of U.S. Non-Provisional patent application Ser. No. 16/733,231, entitled "BOUNDING BOX ESTIMATION, LANE VEHICLE ASSOCIATION, AND OBJECT DETECTION," filed Jan. 2, 2020, which claims the benefit of U.S. Provisional Patent Application No. 62/788,744 entitled "BOUNDING BOX ESTIMATION, LANE VEHICLE ASSOCIATION, AND OBJECT DETECTION," filed Jan. 4, 2019, each of which is assigned to the assignee hereof, and expressly incorporated herein by reference in its entirety.

TECHNICAL FIELD

Aspects of this disclosure relate generally to a single camera based vehicle 3D bounding box (3DBB) estimation using a weak prior information. Aspects of this disclosure also relate generally to a single camera based vehicle 3DBB estimation from a partially observed 2D bounding box (2DBB) using lane prior information. Aspects of this disclosure further relate generally to lane vehicle association to improve vehicle localization using single camera for autonomous driving. Aspects of this disclosure yet further relate generally to object detection at image border for autonomous driving.

BACKGROUND

Modern motor vehicles are increasingly incorporating technology that helps drivers avoid drifting into adjacent lanes or making unsafe lane changes (e.g., Lane Departure Warning (LDW)), or that warns drivers of other vehicles behind them when they are backing up, or that brakes automatically if a vehicle ahead of them stops or slows suddenly (e.g., Forward Collision Warning (FCW)), among other things. The continuing evolution of automotive technology aims to deliver even greater safety benefits, and ultimately deliver Automated Driving Systems (ADS) that can handle the entire task of driving without the need for user intervention.

There are six levels that have been defined to achieve full automation. At Level 0, the human driver does all the driving. At Level 1, an Advanced Driver Assistance System (ADAS) on the vehicle can sometimes assist the human driver with either steering or braking/accelerating, but not both simultaneously. At Level 2, an ADAS on the vehicle can itself actually control both steering and braking/accelerating simultaneously under some circumstances. The human driver must continue to pay full attention at all times and perform the remainder of the driving tasks. At Level 3, an ADS on the vehicle can itself perform all aspects of the driving task under some circumstances. In those circumstances, the human driver must be ready to take back control at any time when the ADS requests the human driver to do so. In all other circumstances, the human driver performs the driving task. At Level 4, an ADS on the vehicle can itself perform all driving tasks and monitor the driving environment, essentially doing all of the driving, in certain circumstances. The human need not pay attention in those circumstances. At Level 5, an ADS on the vehicle can do all the driving in all circumstances. The human occupants are just passengers and need never be involved in driving.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method is disclosed. The method may comprise determining a 2D bounding box (2DBB) associated with a vehicle within a camera frame. The method may also comprise estimating a 3DBB associated with the vehicle based on the 2DBB and lane information. The 3DBB may comprise a first box and a second box. The first box may be associated with a first portion of the vehicle and the second box may be associated with a second portion of the vehicle.

In an aspect, an apparatus is disclosed. The apparatus may comprise memory and a processor communicatively coupled to the memory. The memory and/or the processor may be configured to determine a 2D bounding box (2DBB) associated with a vehicle within a camera frame. The memory and/or the processor may also be configured to estimate a 3DBB associated with the vehicle based on the 2DBB and lane information. The 3DBB may comprise a first box and a second box. The first box may be associated with a first portion of the vehicle and the second box may be associated with a second portion of the vehicle.

In an aspect, another apparatus is disclosed. The apparatus may comprise means for determining a 2D bounding box (2DBB) associated with a vehicle within a camera frame. The method may also comprise means for estimating a 3DBB associated with the vehicle based on the 2DBB and lane information. The 3DBB may comprise a first box and a second box. The first box may be associated with a first portion of the vehicle and the second box may be associated with a second portion of the vehicle.

In an aspect, a non-transitory computer-readable medium storing computer-executable instructions for an apparatus is disclosed. The medium may comprise one or more instruction causing the apparatus to determine a 2D bounding box (2DBB) associated with a vehicle within a camera frame. The medium may also comprise one or more instruction causing the apparatus to estimate a 3DBB associated with the vehicle based on the 2DBB and lane information. The 3DBB may comprise a first box and a second box. The first box may be associated with a first portion of the vehicle and the second box may be associated with a second portion of the vehicle.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
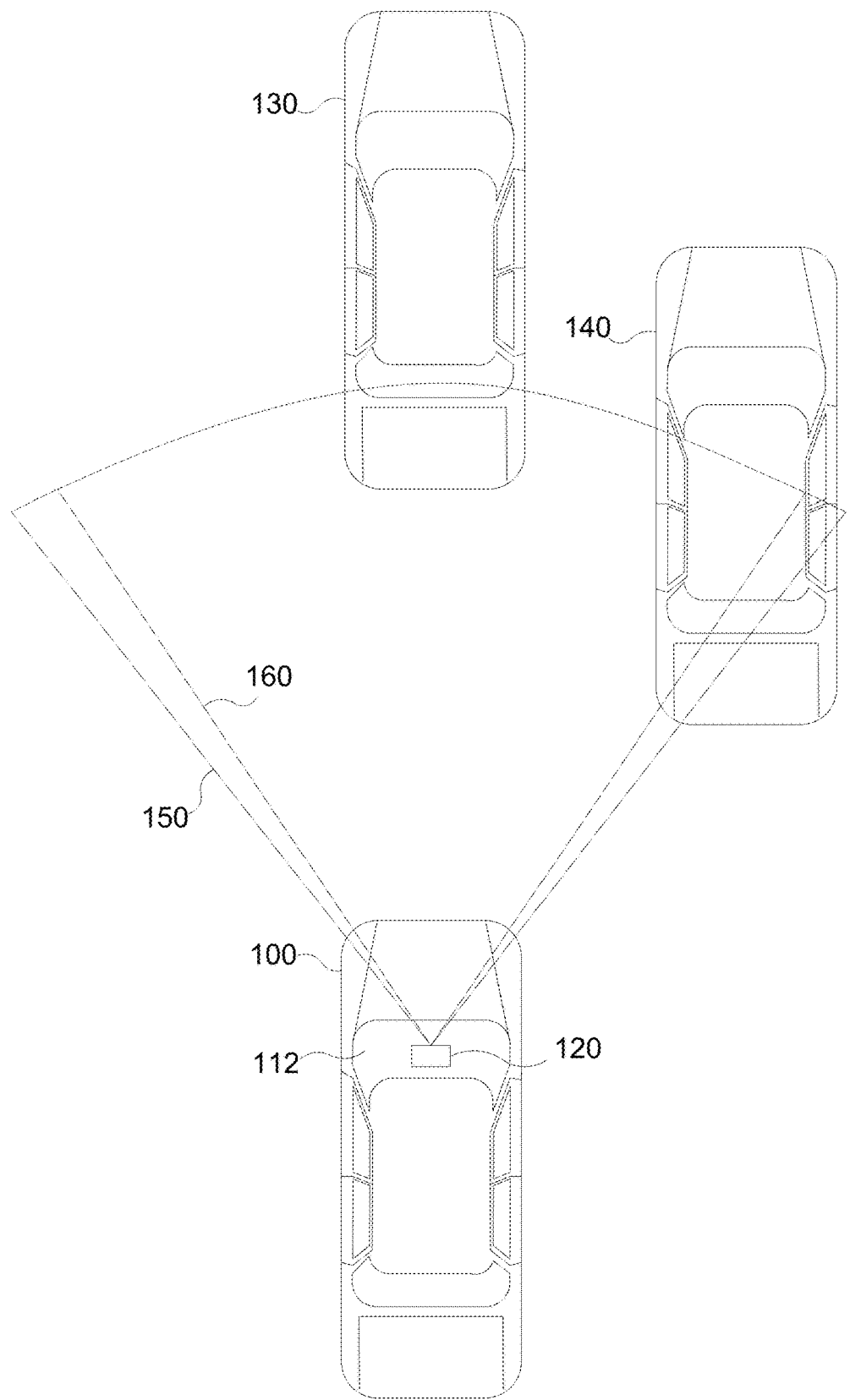
FIG. 1 is a top view of a vehicle employing an integrated radar-camera sensor behind the windshield, according to various aspects of the disclosure.

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Autonomous and semi-autonomous driving safety technologies use a combination of hardware (sensors, cameras, and radar) and software to help vehicles identify certain safety risks so they can warn the driver to act (in the case of an ADAS), or act themselves (in the case of an ADS), to avoid a crash. A vehicle outfitted with an ADAS or ADS includes one or more camera sensors mounted on the vehicle that capture images of the scene in front of the vehicle, and also possibly behind and to the sides of the vehicle. Radar systems may also be used to detect objects along the road of travel, and also possibly behind and to the sides of the vehicle. Radar systems utilize radio frequency (RF) waves to determine the range, direction, speed, and/or altitude of the objects along the road. More specifically, a transmitter transmits pulses of RF waves that bounce off any object(s) in their path. The pulses reflected off the object(s) return a small part of the RF waves' energy to a receiver, which is typically located at the same location as the transmitter. The camera and radar are typically oriented to capture their respective versions of the same scene.

A processor, such as a digital signal processor (DSP), within the vehicle analyzes the captured camera images and radar frames and attempts to identify objects within the captured scene. Such objects may be other vehicles, pedestrians, road signs, objects within the road of travel, etc. The radar system provides reasonably accurate measurements of object distance and velocity in various weather conditions. However, radar systems typically have insufficient resolution to identify features of the detected objects. Camera sensors, however, typically do provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

To further enhance ADAS and ADS systems, especially at Level 3 and beyond, autonomous and semi-autonomous vehicles may utilize high definition (HD) map datasets, which contain significantly more detailed information and true-ground-absolute accuracy than those found in current conventional resources. Such HD maps may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by autonomous/semi-autonomous vehicles. HD maps may also provide electronic horizon predictive awareness, which enables autonomous/semi-autonomous vehicles to know what lies ahead.

Referring now to FIG. 1, a vehicle 100 (e.g., an ego-vehicle) is illustrated that includes a radar-camera sensor module 120 located in the interior compartment of the vehicle 100 behind the windshield 112. The radar-camera sensor module 120 includes a radar sensor component configured to transmit radar signals through the windshield 112 in a horizontal coverage zone 150 (shown by dashed lines), and receive reflected radar signals that are reflected off of any objects within the coverage zone 150. The radar-camera sensor module 120 further includes a camera component for capturing images based on light waves that are seen and captured through the windshield 112 in a horizontal coverage zone 160 (shown by dashed lines).

Although FIG. 1 illustrates an example in which the radar sensor component and the camera component are collocated components in a shared housing, as will be appreciated, they may be separately housed in different locations within the vehicle 100. For example, the camera may be located as shown in FIG. 1, and the radar sensor may be located in the grill or front bumper of the vehicle 100. Additionally, although FIG. 1 illustrates the radar-camera sensor module 120 located behind the windshield 112, it may instead be located in a rooftop sensor array, or elsewhere. Further, although FIG. 1 illustrates only a single radar-camera sensor module 120, as will be appreciated, the vehicle 100 may have multiple radar-camera sensor modules 120 pointed in different directions (to the sides, the front, the rear, etc.). The various radar-camera sensor modules 120 may be under the "skin" of the vehicle (e.g., behind the windshield 112, door panels, bumpers, grills, etc.) or within a rooftop sensor array.

The radar-camera sensor module 120 may detect one or more (or none) objects relative to the vehicle 100. In the example of FIG. 1, there are two objects, vehicles 130 and 140, within the horizontal coverage zones 150 and 160 that the radar-camera sensor module 120 can detect. The radar-camera sensor module 120 may estimate parameters of the detected object(s), such as the position, range, direction, speed, size, classification (e.g., vehicle, pedestrian, road sign, etc.), and the like. The radar-camera sensor module 120 may be employed onboard the vehicle 100 for automotive safety applications, such as adaptive cruise control (ACC), forward collision warning (FCW), collision mitigation or avoidance via autonomous braking, lane departure warning (LDW), and the like.

Collocating the camera and radar sensor permits these components to share electronics and signal processing, and in particular, enables early radar-camera data fusion. For example, the radar sensor and camera may be integrated onto a single board. A joint radar-camera alignment technique may be employed to align both the radar sensor and the camera. However, collocation of the radar sensor and camera is not required to practice the techniques described herein.

Figure 2:
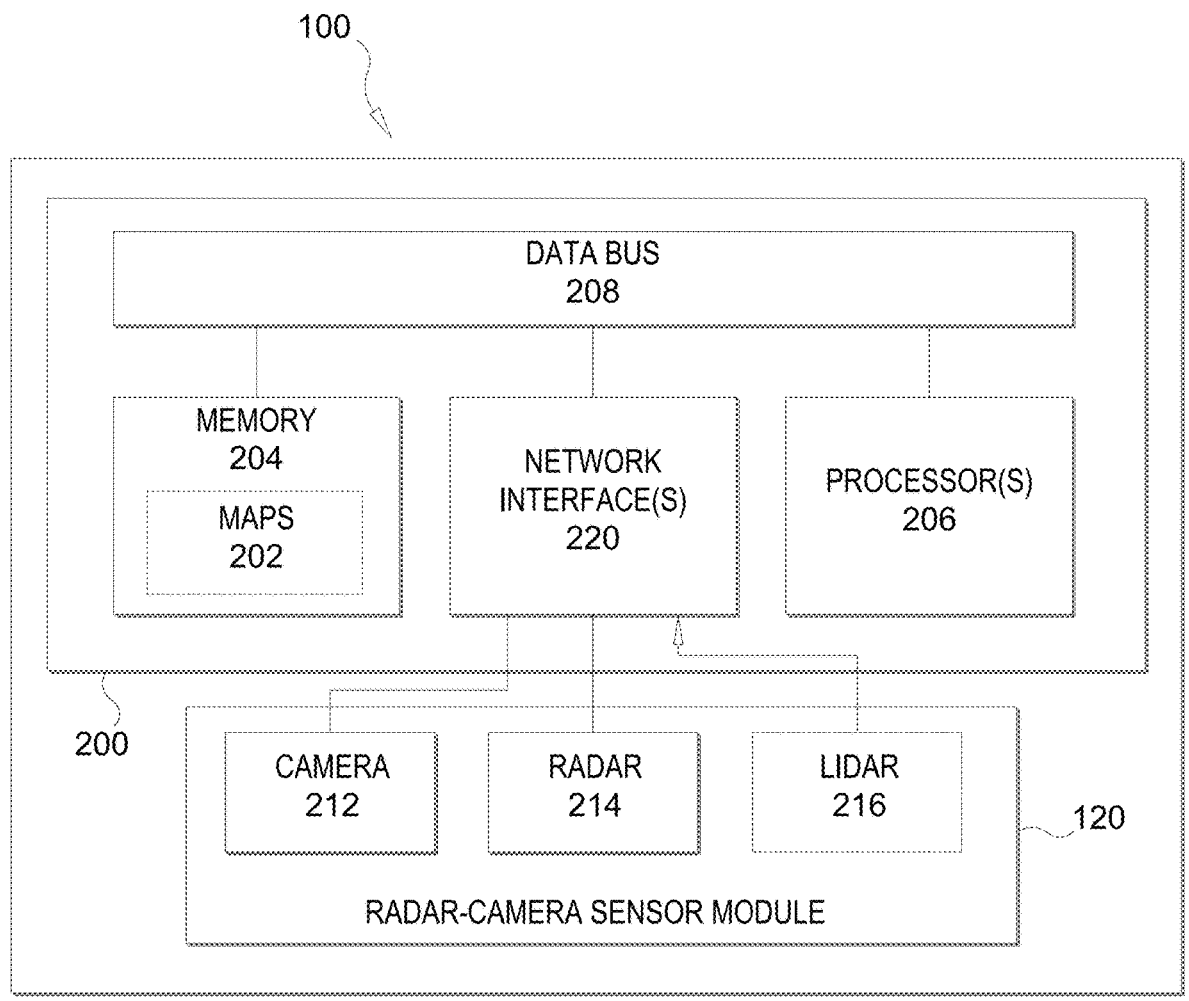
FIG. 2 illustrates an on-board computer architecture, according to various aspects of the disclosure.

FIG. 2 illustrates an on-board computer (OBC) 200 of a vehicle 100, according to various aspects. In an aspect, the OBC 200 may be part of an ADAS or ADS. The OBC 200 includes a non-transitory computer-readable storage medium, i.e., memory 204, and one or more processors 206 in communication with the memory 204 via a data bus 208.

The memory 204 includes one or more storage modules storing computer-readable instructions executable by the processor(s) 206 to perform the functions of the OBC 200 described herein.

One or more radar-camera sensor modules 120 are coupled to the OBC 200 (only one is shown in FIG. 2 for simplicity). In some aspects, the radar-camera sensor module 120 includes at least one camera 212, at least one radar sensor 214, and an optional Light Detection and Ranging (LiDAR) sensor 216. The OBC 200 also includes one or more network interfaces 220 connecting the processor(s) 206, by way of the data bus 208, to the radar-camera sensor module 120, other vehicle sub-systems (not shown), and in some cases, wireless communication networks (not shown), such as wireless local area networks (WLANs), global positioning systems (GPS) networks, cellular telecommunication networks, and the like.

In an aspect, the OBC 200 may utilize the network interfaces 220 to download one or more maps 202 that can then be stored in memory 204 and used for vehicle navigation. Map(s) 202 may be one or more high definition (HD) maps, which may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by vehicle 100. Map(s) 202 may also provide electronic horizon predictive awareness, which enables the vehicle 100 to know what lies ahead.

In an aspect, the camera 212 may capture image frames (also referred to herein as camera frames) of the scene within the viewing area of the camera 212 (as illustrated in FIG. 1 as horizontal coverage zone 160) at some periodic rate. Likewise, the radar sensor 214 may capture radar frames of the scene within the viewing area of the radar sensor 214 (as illustrated in FIG. 1 as horizontal coverage zone 150) at some periodic rate. The periodic rates at which the camera 212 and the radar sensor 214 capture their respective frames may be the same or different. Each camera and radar frame may be timestamped. Thus, where the periodic rates are different, the timestamps can be used to select simultaneously, or nearly simultaneously, captured camera and radar frames for further processing (e.g., fusion).

Figure 3:
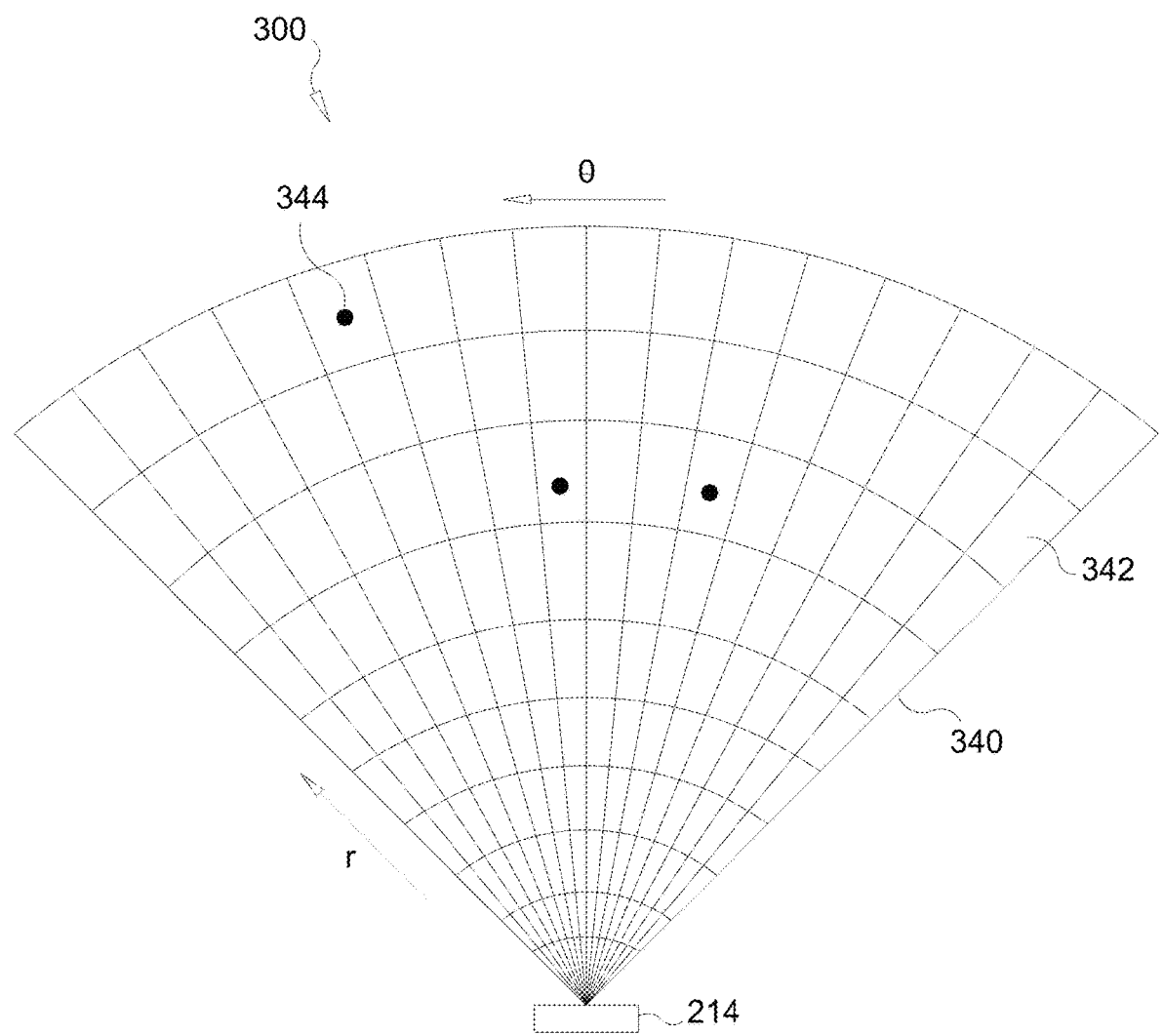
FIG. 3 is a schematic of a sensed occupancy radar grid, according to various aspects of the disclosure.

FIG. 3 illustrates a sensed occupancy radar grid 300. A transmitter (e.g., an array of transmit antennas) of the radar sensor 214 generates an electromagnetic field in the direction the transmitter is pointing (e.g., horizontal coverage zone 150). More specifically, the transmitter transmits pulses of RF waves that reflect off object(s) in the transmission path of the RF waves, such as vehicles 130 and 140 in FIG. 1. A portion of the RF waves that are reflected off the object(s) are returned to a receiver (e.g., an array of receive antennas) of the radar sensor 214, which is usually located at the same site as the transmitter of the radar sensor 214.

In an aspect, the radar sensor 214 may be an imaging radar sensor that uses beamforming to scan horizontally and vertically. Beamforming is a technique used to aim the effective direction of a radar beam by changing the delay between different transmitting antennas so that the signals add constructively in a specified direction. Thus, the radar sensor 214 may scan horizontally and vertically across the sensing area (e.g., horizontal coverage zone 150) by using a transmitter comprising an array of electronically steered antennas.

The electromagnetic field generated by the radar sensor 214 is characterized as an occupancy grid 340 having a plurality of observation cells 342. Features 344 are extracted from the cells 342 to determine whether the feature 344 is an object (e.g., a vehicle 130/140). Each feature 344 within a respective cell 342 can be identified as having up to four parameters: range, Doppler, azimuth, and elevation. As an example, a feature 344 within a cell 342 may be the signal-to-noise ratio (SNR) computed by a constant false alarm rate (CFAR) algorithm. However, it should be understood that other methods may be used to target and identify features 344 within a cell 342.

The processor(s) 206 generate four dimensional (4D) tensors for features 344 within cells 342 of the occupancy grid 340 detected by the radar sensor 214. The generated tensors represent the range (distance from the vehicle 100 to the detected feature 344), azimuth (the horizontal distance between a feature 344 and a reference RF ray emitted by the radar sensor 214, such as the initial RF ray of a radar sweep), Doppler (indicating the speed of the detected feature 344), and elevation (vertical direction from the radar sensor 214 to the detected feature) of each detected feature 344. The processor(s) 206 then performs object detection, object classification, localization, and property estimation based on the tensors and undistorted camera frames received from the camera 212.

Figure 4:
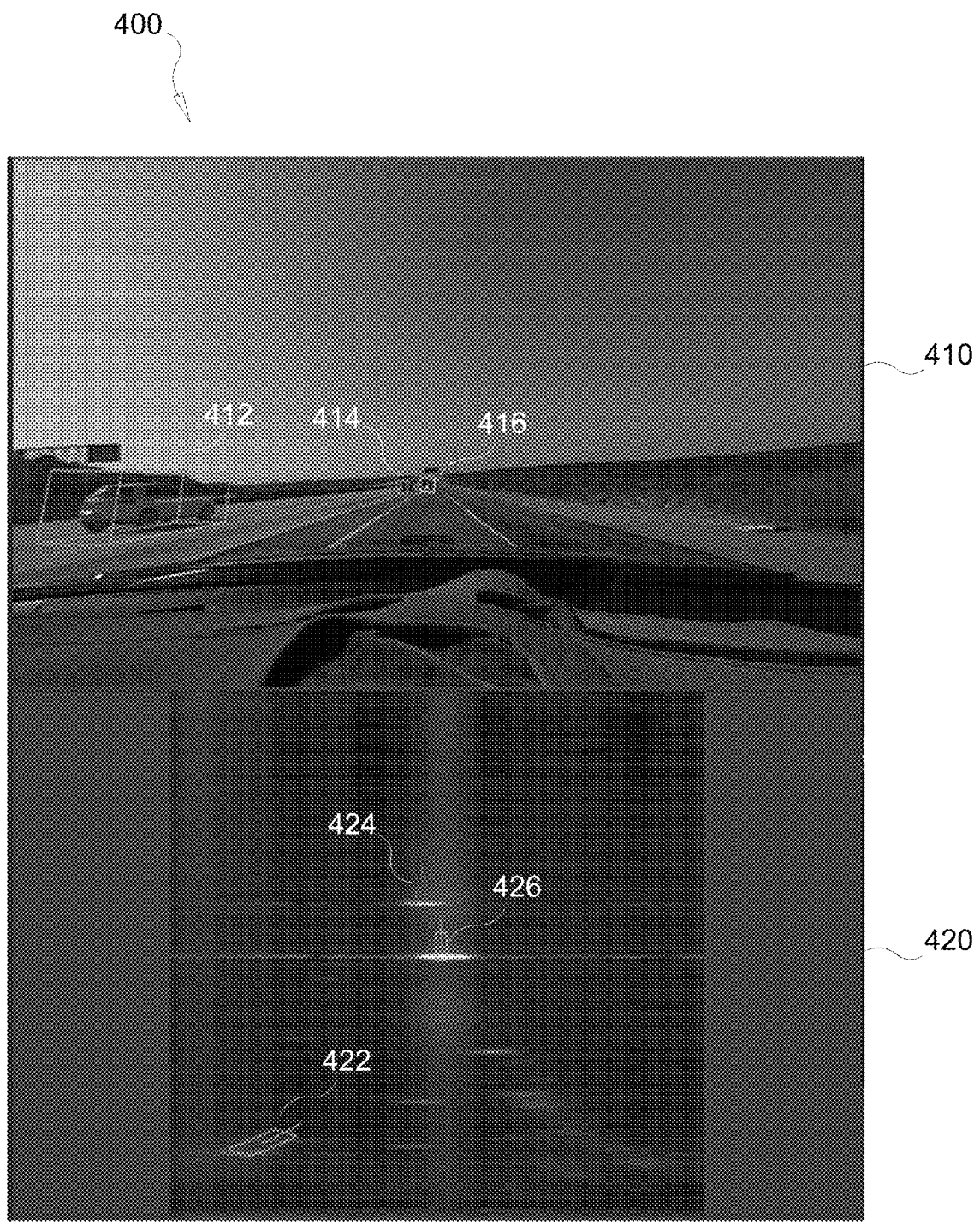
FIG. 4 illustrates a comparison between an exemplary camera frame and exemplary radar frame, according to various aspects of the disclosure.

FIG. 4 illustrates a pair 400 of a camera image 410 and a radar image 420 of the same scene. The camera image 410 may have been captured by the camera 212, and the radar image 420 may have been captured by the radar sensor 214. The camera 212 captures raw camera frames of the scene within the viewing area of the camera 212 (as illustrated in FIG. 1 as horizontal coverage zone 160). The processor(s) 206 correct any distortion in the raw camera frames to generate undistorted camera frames that are used for processing with the radar tensors. The camera image 410 is an example of an undistorted camera frame. Note that the terms "frame" and "image" are used interchangeably herein.

The radar image 420 is captured and processed as discussed above with respect to FIG. 3. The camera image 410 and the radar image 420 are then processed to identify objects within the respective images. Object detection in radar images was discussed above with respect to FIG. 3. Object detection in camera images is well-known in the art and is therefore not further described here for the sake of brevity. Any object detection methods and/or techniques may be used to detect objects in the camera images.

The results of the object detection are various attributes of the detected object(s), including bounding boxes in Cartesian x-y(-z) coordinates that tightly enclose the object(s). In the camera image 410, three objects have been detected, each surrounded by a bounding box 412, 414, and 416. In the radar image 420, the same three objects have been detected and are surrounded by bounding boxes 422, 424, and 426. As can be seen in FIG. 4, the shapes of the objects/bounding boxes 422, 424, and 426 in the radar image 420 are different sizes and shapes based on their distance from the radar sensor (e.g., radar sensor 214). For example, the bounding boxes associated with the closer objects (bounding box 422) are larger than the bounding boxes associated with farther objects (bounding boxes 424 and 426) due to reception at the radar sensor 214 of fewer reflected radio waves due to the greater distance between the radar sensor 214 and the further objects.

Once one or more objects (or none) have been identified in the camera image 410, the processor(s) 206 may use pattern-recognition and/or object recognition algorithms to classify the object(s) as road signs, traffic barrels, cars, trucks, motorcycles, bicyclists, and pedestrians. The fine pixel resolution of an image enables precise angular localization of recognized objects. Range may be estimated from stereo disparity if two cameras are used. Otherwise, a monocular system can estimate range from expected object size or displacement from the horizon. Object classification for radar images is more difficult, and often relies on correlating the object(s) detected in the radar image (e.g., radar image 420) to the object(s) detected in the corresponding (i.e., simultaneously, or nearly simultaneously, captured) camera image (e.g., camera image 410).

More specifically, the radar sensor 214 provides reasonably accurate measurements of object distance and velocity in various weather conditions. However, radar systems typically have insufficient resolution to identify features of the detected objects. The camera 212, however, may provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

Further, recent advances in machine-learning techniques have made object-classification systems for both camera images and radar images much more effective. For example, deep neural networks (mathematical functions with many layers of nodes that resemble the connectivity of brain neurons) are now practical to train due to recently developed algorithms and the availability of "big data" image sets. The heavy mathematics can now be applied to every pixel in a video/radar stream in real time due to miniature supercomputers comprised of inexpensive graphics processing units (GPUs).

Figure 5:
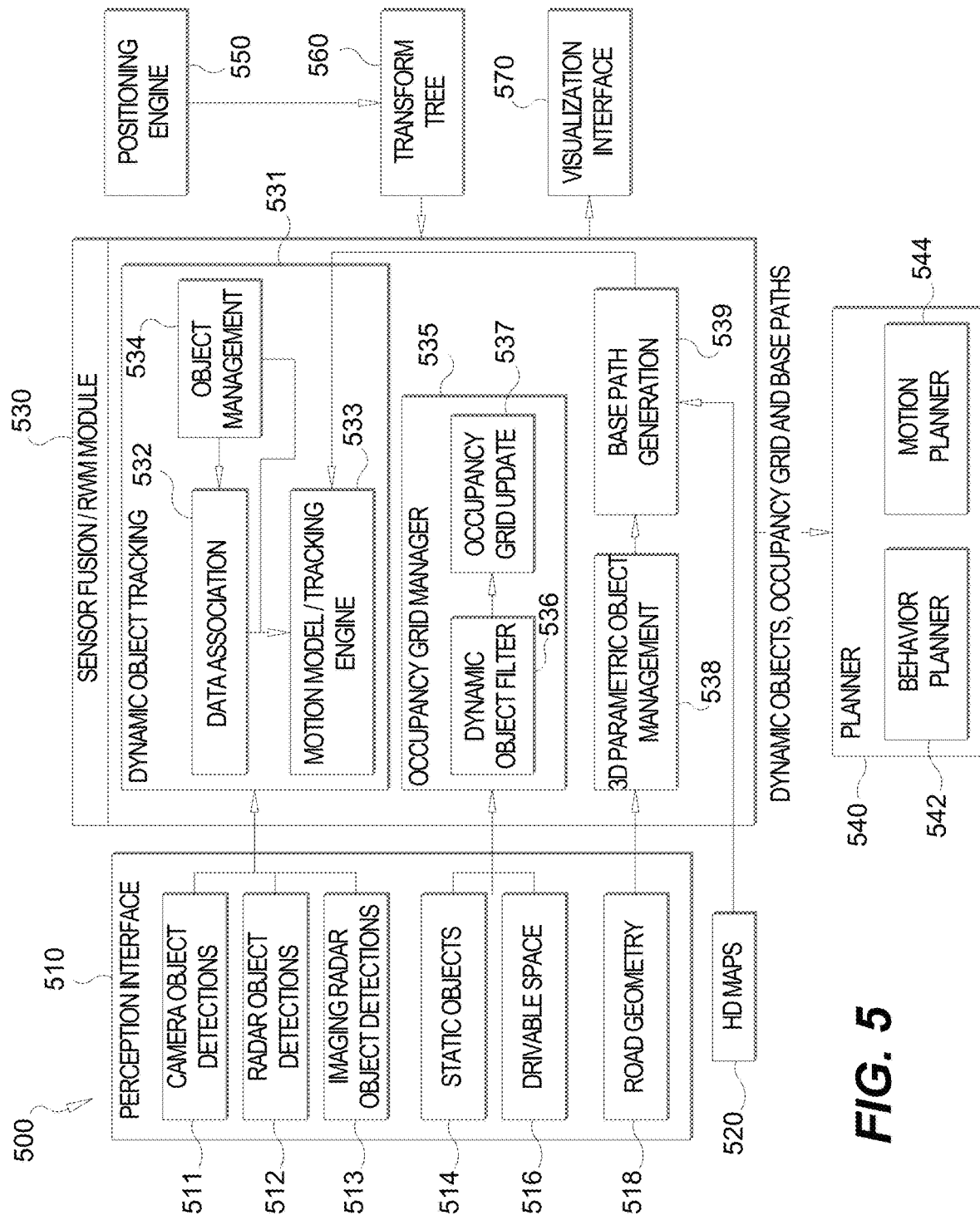
FIG. 5 illustrates an exemplary sensor fusion architecture, according to aspects of the disclosure.

FIG. 5 illustrates an exemplary sensor fusion architecture 500, according to aspects of the disclosure. In an aspect, the sensor fusion architecture 500 may be implemented by the radar-camera sensor module 120 and/or the OBC 200 of FIG. 2. A perception interface 510 of the sensor fusion architecture 500 provides inputs to a sensor fusion/real world model (RWM) module 530. In the example of FIG. 5, the perception interface 510 includes camera object detections 511 (e.g., detected based on data from the camera 212), optional radar object detections 512 (e.g., detected based on data from the optional LiDAR sensor 216), and imaging radar object detections 513 (e.g., detected based on data from the radar sensor 214). The perception interface 510 also includes information about static objects 514, drivable space 516, and road geometry 518. The information about static objects may be bounding box information, the same as for vehicles. Information about drivable space may include a per pixel label indicating whether that pixel is drivable or not. The information about road geometry may be a spline representation of the lane boundaries.

In the example of FIG. 5, the sensor fusion/RWM module 530 of the sensor fusion architecture 500 includes a dynamic object tracking module 531 that includes a data association module 532, a motion model/tracking engine 533, and an object management module 534. The data association module 532 identifies which target vehicle(s) in previous camera/radar frames are matched to currently detected vehicle(s) and associates them with each other across the camera/radar frames. The dynamic object tracking module 531 receives the camera object detections 511, optional radar object detections 512, and imaging radar object detections 513 from the perception interface 510 and generates dynamic object detections (e.g., detections of moving objects, including their path, speed, rotation, etc.). The sensor fusion/RWM module 530 also includes an occupancy grid manager module 535 that includes a dynamic object filter module 536 and an occupancy grid update module 537. The occupancy grid manager module 535 receives the information about the static objects 514 and the drivable space 516 from the perception interface 510 and the occupancy grid update module 537 updates the occupancy grid information (e.g., which grid boxes are occupied and which are open). Finally, the sensor fusion/RWM module 530 includes a 3D parametric object management module 538 and a base path generation module 539 that receive as input information about the road geometry 518 and HD maps 520 (e.g., map(s) 202), respectively, and outputs base paths (e.g., the center-of-the-lane path that the host vehicle and/or nearby vehicles are expected to follow).

The sensor fusion architecture 500 also includes a positioning engine 550 (e.g., a GPS, motion sensors (e.g., accelerometer, gyroscope, etc.), etc.) and a transform tree module 560 that provide further inputs to the sensor fusion/RWM module 530.

The sensor fusion/RWM module 530 outputs the dynamic object detections, occupancy grid, and base paths to a planner module 540 of the sensor fusion architecture 500. The planner module 540 includes a behavior planner module 542 and a motion planner module 544 that direct other systems (e.g., braking, accelerations, steering, cruise control, signaling, etc.) of the host vehicle (e.g., vehicle 100 of FIGS. 1 and 2) to act (e.g., brake, accelerate, change lanes, etc.) based on the information about the dynamic objects, the occupancy grid, and the base paths received from the sensor fusion/RWM module 530. The sensor fusion/RWM module 530 also outputs to a visualization interface 570. The visualization interface 570 may be connected to a display (e.g., light emitting diode (LED) display, liquid crystal display (LCD), etc., not shown) within the host vehicle (e.g., vehicle 100), such as on the dashboard or behind the steering wheel, to provide information to a driver or occupant within the vehicle.

Although the sensor fusion architecture 500 shown in FIG. 5 is primarily directed to reacting to events (e.g., other vehicles changing lanes, turning onto the roadway, braking, etc.) that may occur while the vehicle is driving, as will be appreciated, the sensor fusion architecture 500 may also receive input from a driver of the vehicle (e.g., direction to change lanes, turn, etc.) and act on those instructions based on the information generated by the sensor fusion/RWM module 530. For example, in the case of an instruction to change lanes, the sensor fusion architecture 500 may first determine that there is a lane to change into and that there are no vehicles in it before the planner module 540 directs the vehicle to change lanes as instructed.

Figure 6:
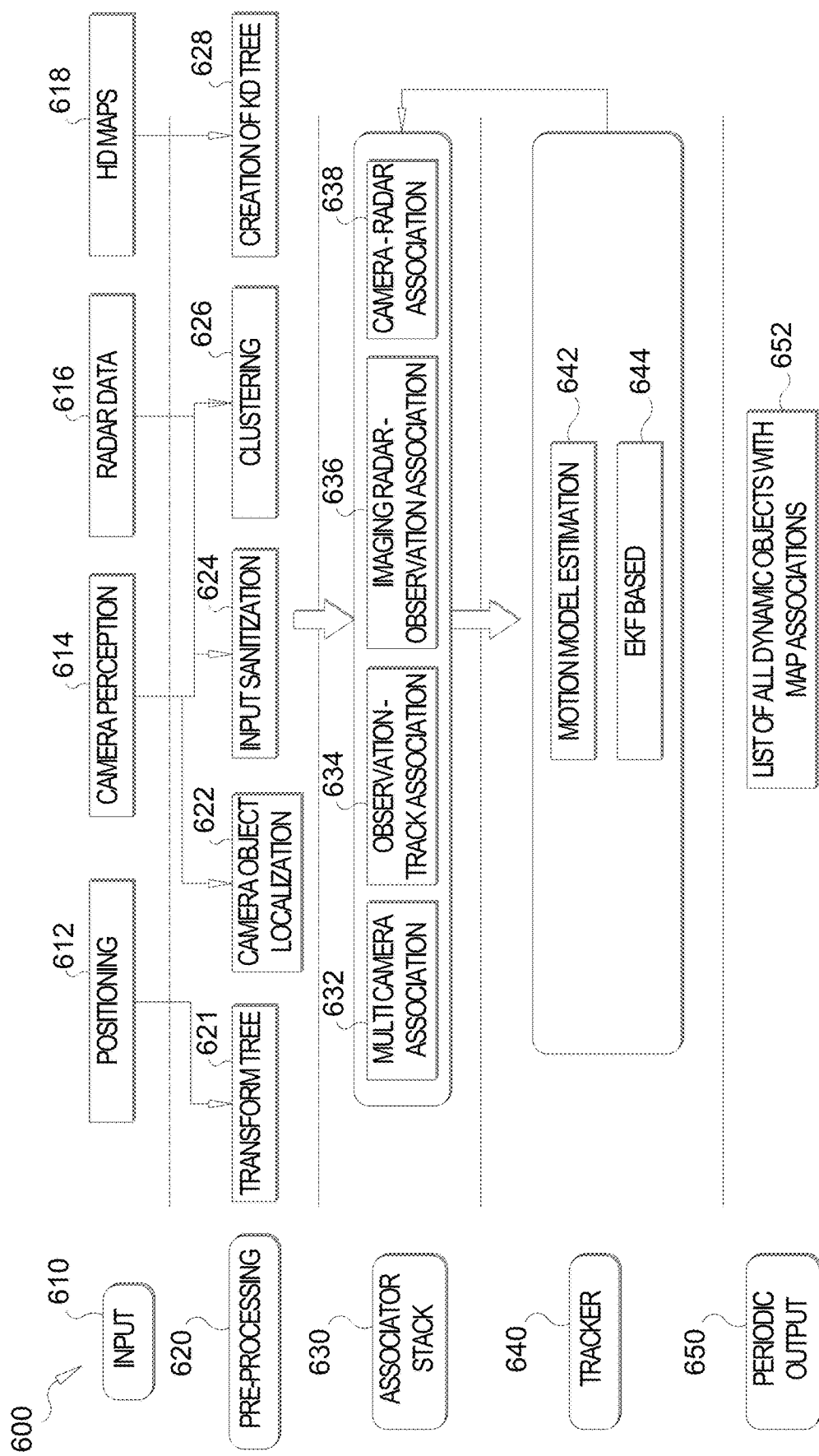
FIG. 6 illustrates an exemplary object tracking architecture, according to aspects of the disclosure.

FIG. 6 illustrates an exemplary object tracking architecture 600, according to aspects of the disclosure. In an aspect, the object tracking architecture 600 may be implemented by the radar-camera sensor module 120 and/or the OBC 200 of FIG. 2, and more specifically, the dynamic object tracking module 531 of the sensor fusion/RWM module 530 in FIG. 5. At an input stage 610, the object tracking architecture 600 receives as input positioning information 612 (e.g., GPS information), camera perception information 614 (e.g., camera images from camera 212), radar data 616 (e.g., radar frames from radar sensor 214), and HD maps 618 (e.g., HD maps 520 of FIG. 5).

At a pre-processing stage 620, the object tracking architecture 600 creates a transform tree 621 (a binary tree representation of multiple coordinate frames as nodes, and links storing the transformation matrix to move from one coordinate frame to another) from the positioning information 612. The pre-processing stage 620 performs camera object localization 622, input sanitization 624, and clustering 626 operations on the camera perception information 614 and radar data 616. The pre-processing stage 620 uses the HD maps 618 for creation of a k-D tree 628 (a space-partitioning data structure for organizing points in a k-dimensional space).

At an associator stack stage 630, the object tracking architecture 600 generates multi camera associations 632, observation track associations 634, imaging radar observation associations 636, and camera radar associations 638. At a tracker stage 640, the object tracking architecture 600 performs motion model estimation 642 and an extended Kalman filter (EKF) based 644 solution (discussed further below). Finally, at a periodic output stage 650, the object tracking architecture 600 outputs a list of all dynamic objects with respective map associations 652. This information is then fed to the planner module 540 in FIG. 5.

Figure 7:
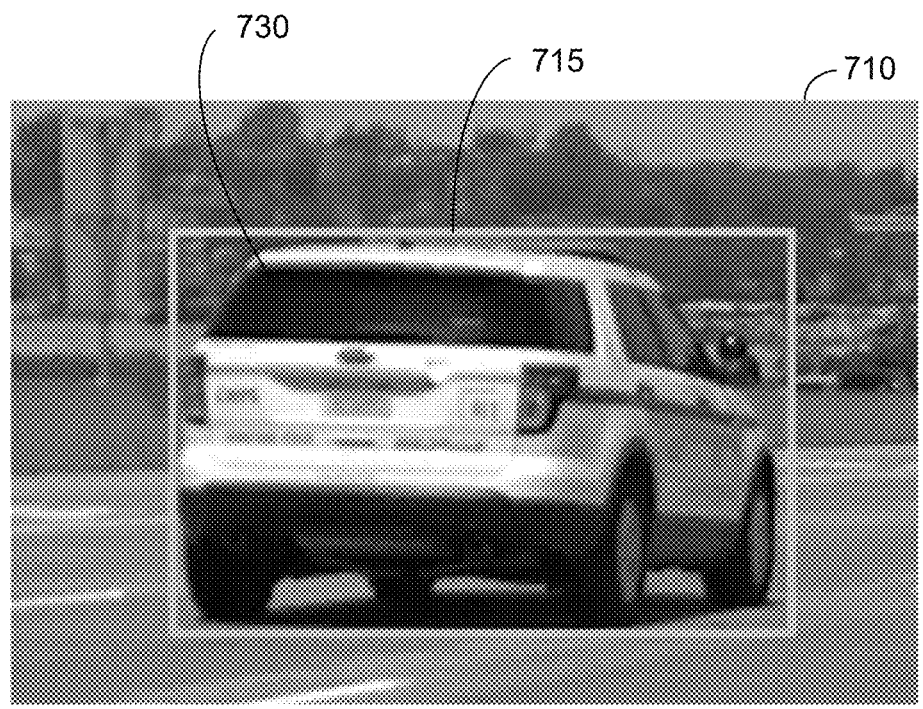
FIG. 7 illustrates a comparison between a 2D bounding box and a 3D bounding box, according to various aspects of the disclosure.
Figure 7:
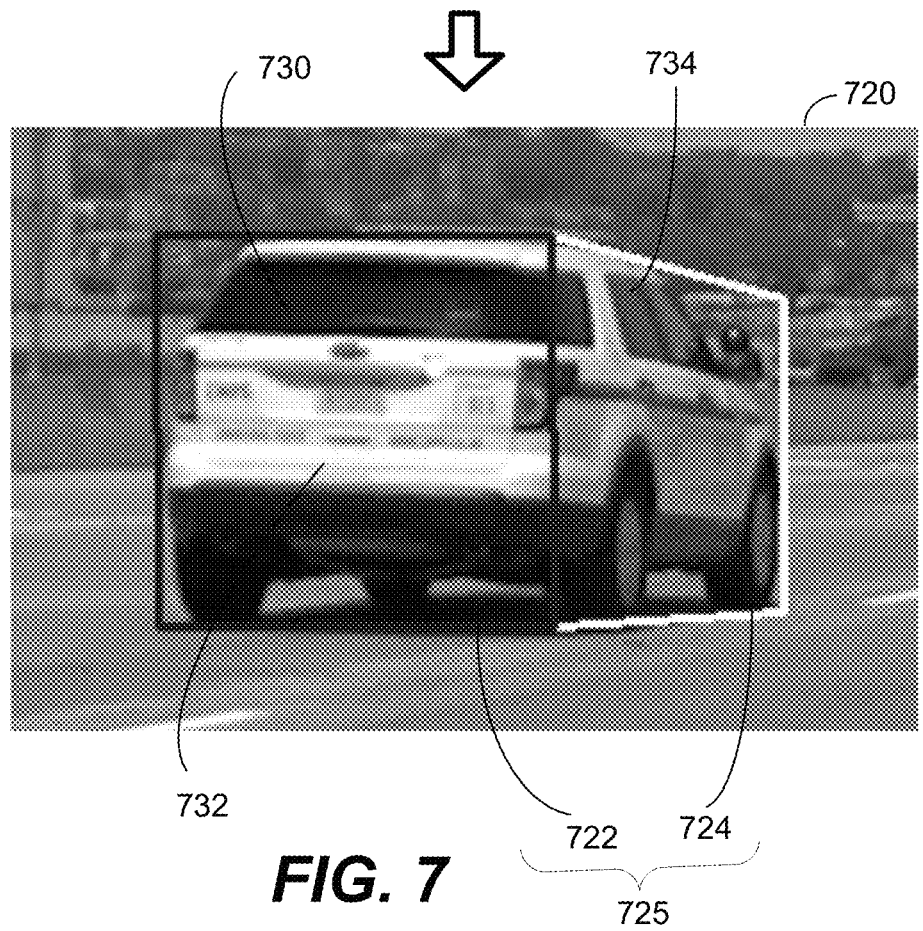

Aspects of this disclosure relate generally to single camera based vehicle 3D bounding box (3DBB) estimation using weak prior information. In autonomous driving, a camera (e.g., camera 212) of an ego vehicle captures continuous 2D camera frames. For each camera frame, the processing system (e.g., OBC200) detects objects such as other vehicles within the camera frame and associates the objects with 2D bounding boxes (2DBB). For example, the objects may be bound with the 2DBBs. FIG. 7 shows an image 710 with a 2DBB 715 associated with a vehicle 730. For example, the 2DBB 715 may comprise one box that bounds the vehicle 730. The box may bound the entirety of the vehicle 730.

FIG. 7 also shows an image 720 with a 3DBB 725 associated with the same vehicle 730. For example, the 3DBB 725 may also bound the vehicle 730. Note that the images 710, 720 may be a same camera frame. In this instance, the 3DBB 725 provides more information than the 2DBB 715 in that the 3DBB 725 visually separates one portion (e.g., the back) of the vehicle 730 from another portion (e.g., the side) of the same vehicle 730. Thus, it is often desirable to provide a 3DBB 725. In particular, the 3DBB 725 is illustrated as comprising a first box 722 associated with a first portion 732 of the vehicle 730 and a second box 724 associated with a second portion 734 of the vehicle 730. For example, the first box 722 may bound the first portion (e.g., back side) 732, and the second box 724 may bound the second portion (e.g., right side) 734. The first and second boxes 722, 724 together may bound the entirety of the vehicle 730.

This is merely illustrative and should not be taken as limiting. For example, the first side can be a front side of the vehicle (not shown), and the second side can be a left side of the vehicle (not shown). In another instance, the first box may be associated with front or back side of a vehicle and the second box may be associated with the top side (e.g., if the camera is positioned high directly in front or back of the vehicle when the image is captured). Indeed, in some instances, the 3DBB 725 may include a third box (not shown) associated with a third side (e.g., top/bottom side) of the vehicle when the camera is positioned high relative to the vehicle and is not directly in front or back of the vehicle.

In an aspect, the first and second boxes 722, 724 may share a common edge (e.g., right edge of the first box 722 in common with left edge of the second box 724). More generally, each box of the 3DBB 725 may share an edge with each of the other box of the 3DBB 725. Further, the boxes of the 3DBB 725 need not be a rectangle. For example, note that the shape of the second box 724 visually provides some depth information.

When armed with vehicle model classification information and 3D vehicle models, conventional systems can estimate a 3DBB of a vehicle from a 2DBB. The basic concept of conventional techniques is to localize a matched 3D vehicle model that fits the projected 3DBB boundary into the 2DBB boundary.

Figure 8A:
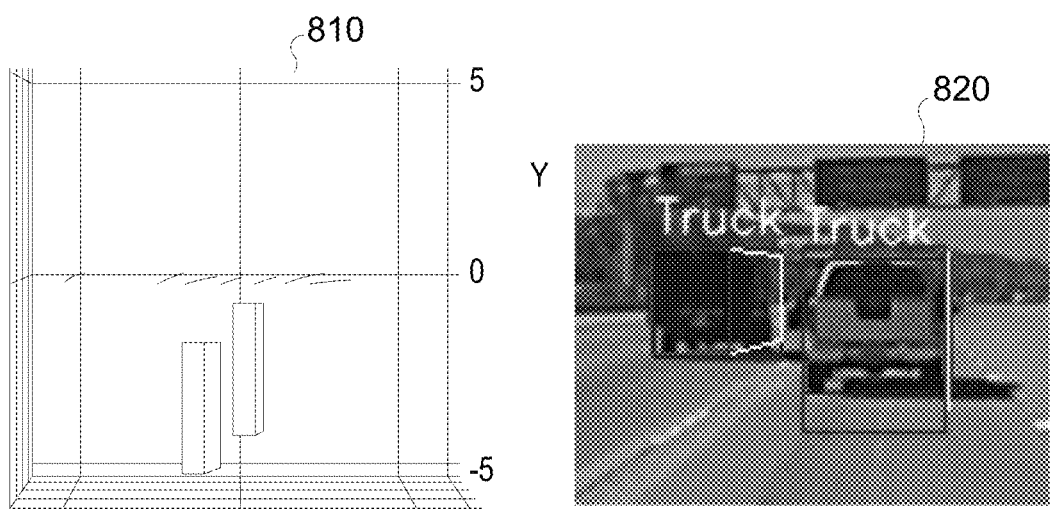
FIGS. 8A and 8B illustrate a comparison between conventional and proposed techniques of estimating a 3D bounding box from a 2D bounding box, according to various aspects of the disclosure.

Conventional techniques do have their weaknesses however. Problems arise when the recognized target and model are mismatched due to misclassification. For example, an SUV may be misclassified as a truck. Problems also arise when there is no vehicle model that matches the detected target vehicle. Due to such issues, the conventionally estimated 3DBB may be located below the level of the road or be considered as flying in the air. Also, the projected bounding boxes are inaccurate. Both problematic issues are illustrated in FIG. 8A. For example, in graph 810, both trucks are estimated to be below road level (e.g., below "0"). Also, in image 820, it is seen that the bounding boxes of the truck on the right are inaccurate.

Figure 8B:
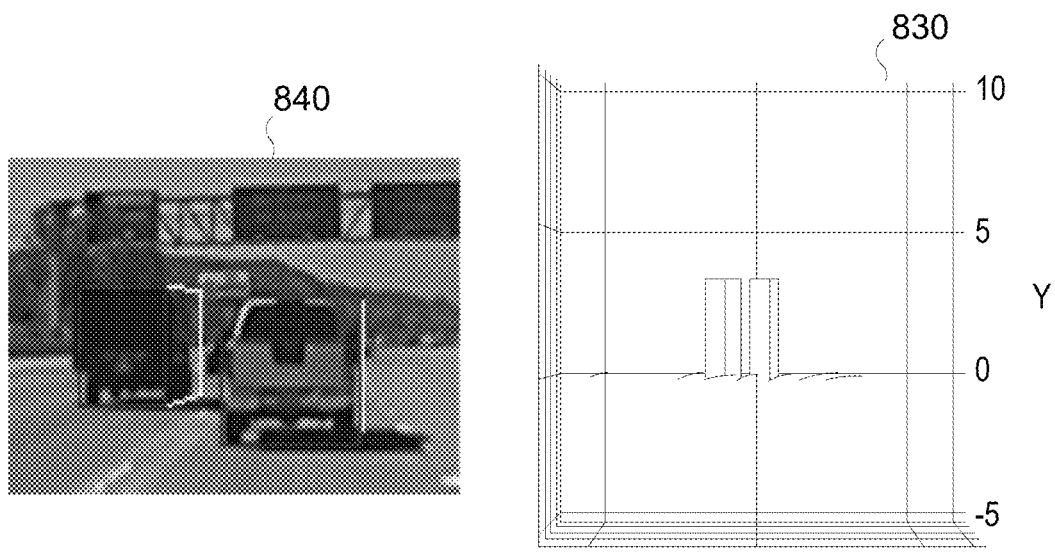

Technique(s) and/or process(es) are proposed to address such shortcomings of conventional techniques. The proposed technique can be more accurate as demonstrated in graph 830 and image 840 of FIG. 8B. The proposed technique achieves the better accuracy without requiring classification information, and also without requiring that the exact 3D model for a detected vehicle be available.

Figure 9:
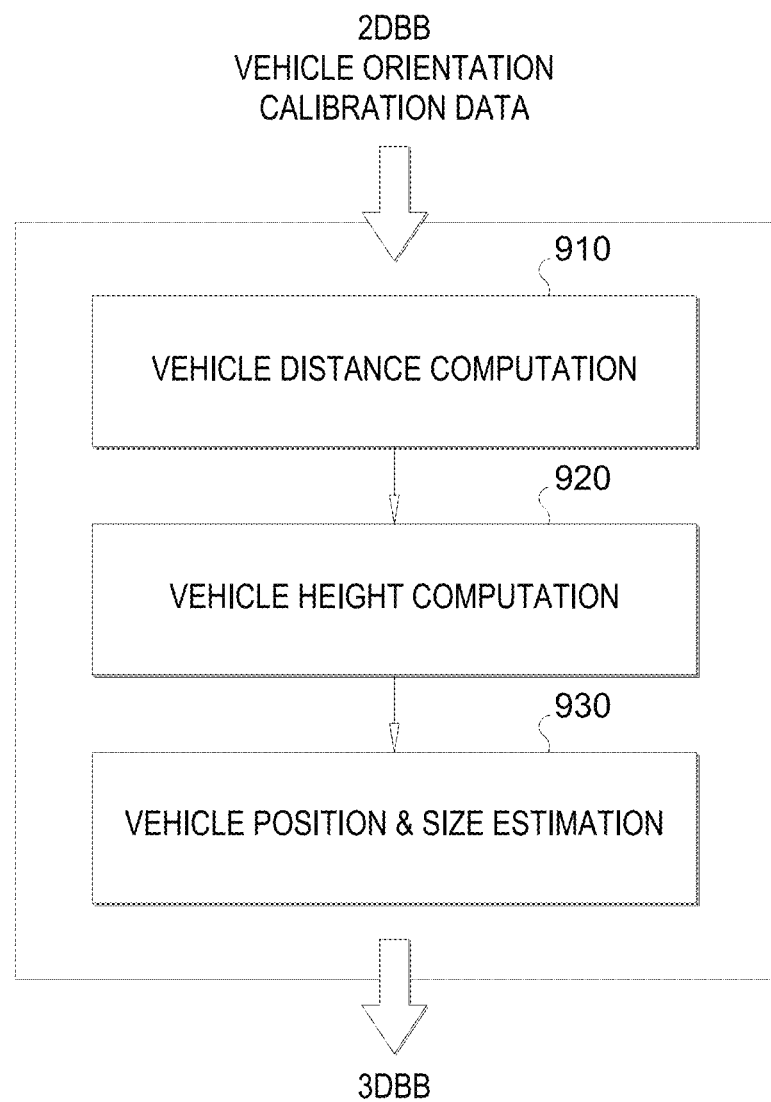
FIG. 9 illustrates example stages of a proposed technique for estimating a 3D bounding box from a 2D bounding box, according to various aspects of the disclosure.

FIG. 9 illustrates a block diagram of example stages of the proposed technique/process, e.g., performed by a system on an ego-vehicle. The system may comprise any combination of the architectures of FIGS. 2, 5 and 6. The proposed technique/process includes the following stages: a vehicle distance computation stage 910, a vehicle height computation stage 920, and a vehicle position & size estimation stage 930. Inputs to the proposed process include the 2DBB, vehicle's orientation, and calibration data.

Figure 10A:
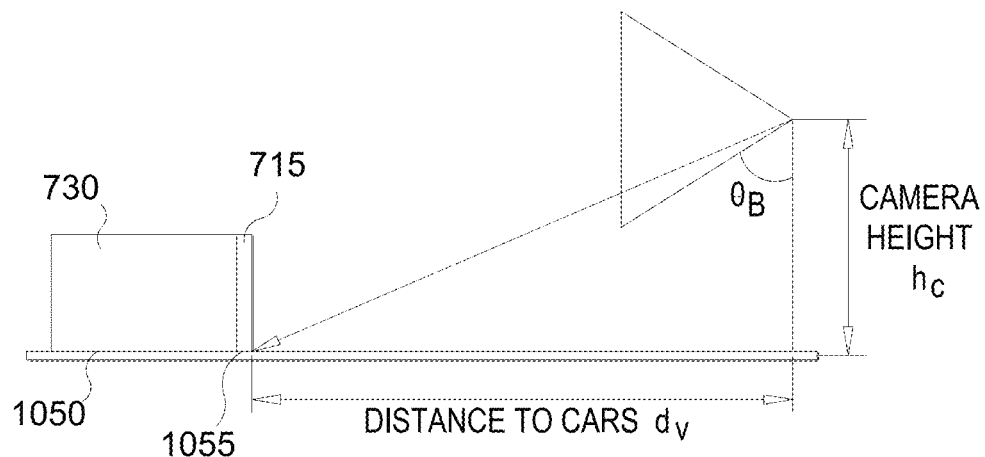
FIG. 10A-10E illustrate example implementations of stages of proposed technique for estimating a 3D bounding box from a 2D bounding box, according to various aspects of the disclosure.

FIG. 10A illustrates an example implementation the vehicle distance computation stage 910 of FIG. 9. In this stage, a distance between the vehicle and a camera is used to capture the camera frame is determined. To state it another way, the distance between the vehicle 730 and the camera used to capture the camera frame 710 that includes the 2DBB 715 is determined. In an aspect, a bottom ray angle $\theta_B$ from the camera to a bottom 1050 of the vehicle 730 (or "vehicle bottom") is determined using an orientation of the camera (or "camera orientation") and a bottom edge 1055 of the 2DBB 715. The distance $d_V$ (or "vehicle distance") is calculated based on the bottom ray angle $\theta_B$ and a height $h_C$ of the camera (or "camera height"). For example, $d_V = h_C \tan \theta_B$ can be calculated. The camera orientation and camera height $h_C$ may be obtained from the calibration data, which may be prepopulated.

Figure 10B:
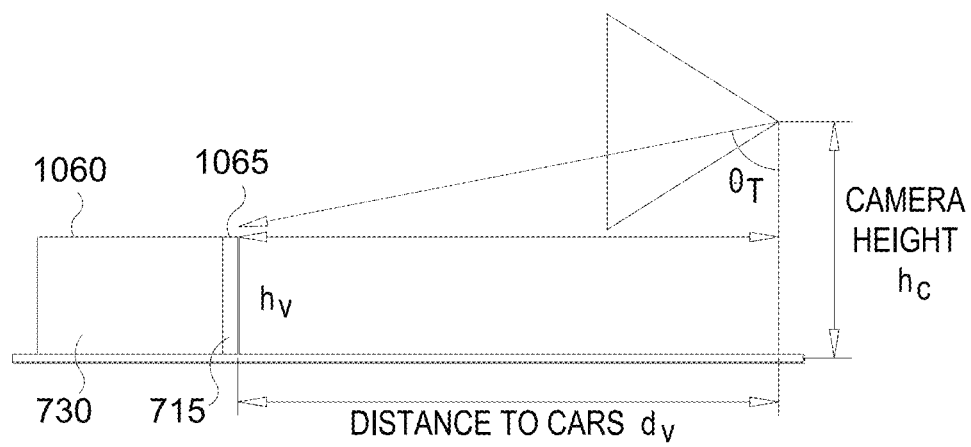

FIG. 10B illustrates an example implementation the vehicle height computation stage 920 of FIG. 9. In this stage, a height $h_C$ of the vehicle 730 (or "vehicle height") is determined. In an aspect, a top ray angle $\theta_T$ from the camera to a top 1060 of the vehicle 730 (or "vehicle top") is determined using the camera orientation and a top edge 1065 of the 2DBB 715. Then a gap g between the camera height $h_C$ and the vehicle top 1060 is determined using the top ray angle $\theta_T$ and the vehicle distance $d_V$, e.g., $g = d_V \cot \theta_T$. The vehicle height $h_V$ is calculated based on the camera height $h_C$ and the gap g, e.g., $h_V = h_C - g$. Note that the vehicle's classification (e.g., sedan, SUV, truck, etc.) need NOT be used to determine the vehicle height $h_V$. This alleviates one of the problems associated with the conventional techniques. It should be noted however that vehicle classifications can be useful in other circumstances (e.g., when only a part of a vehicle is in field of view of the camera).

Figure 10C:
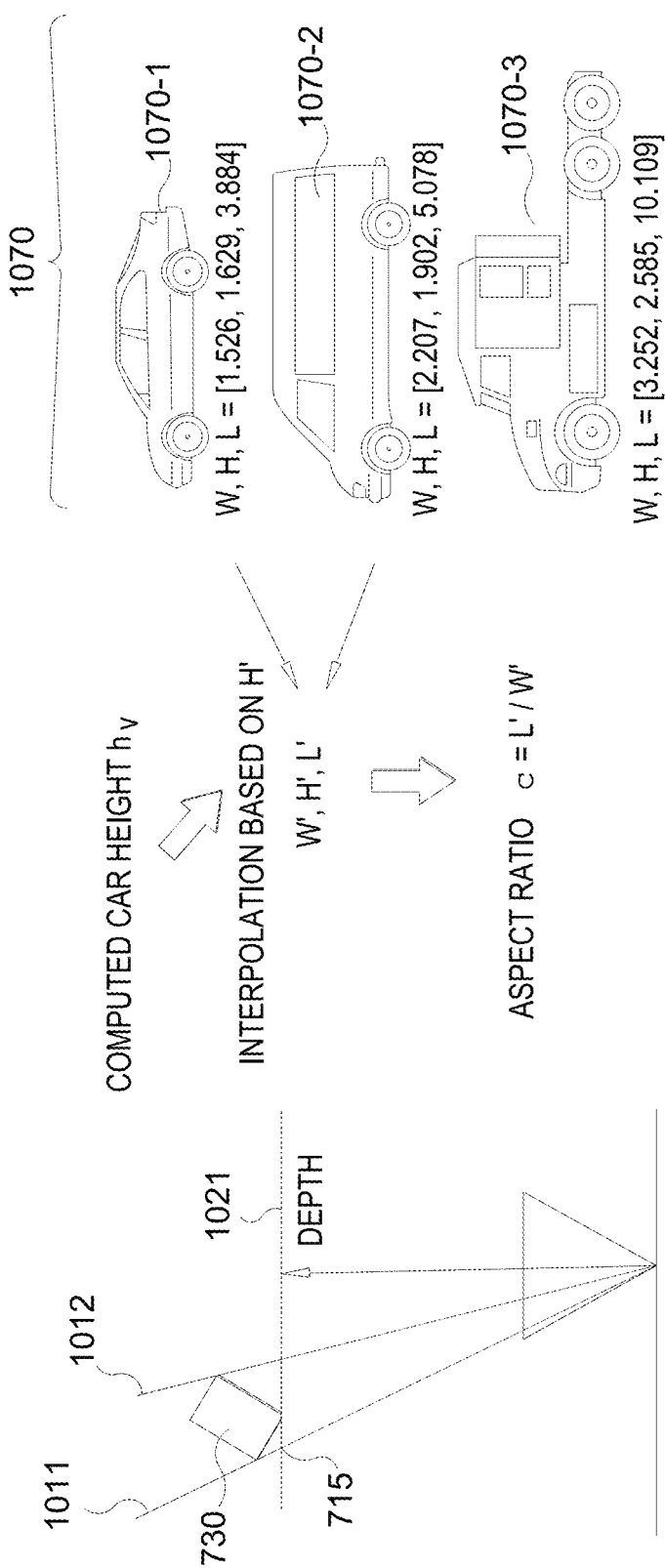
Figure 10D:
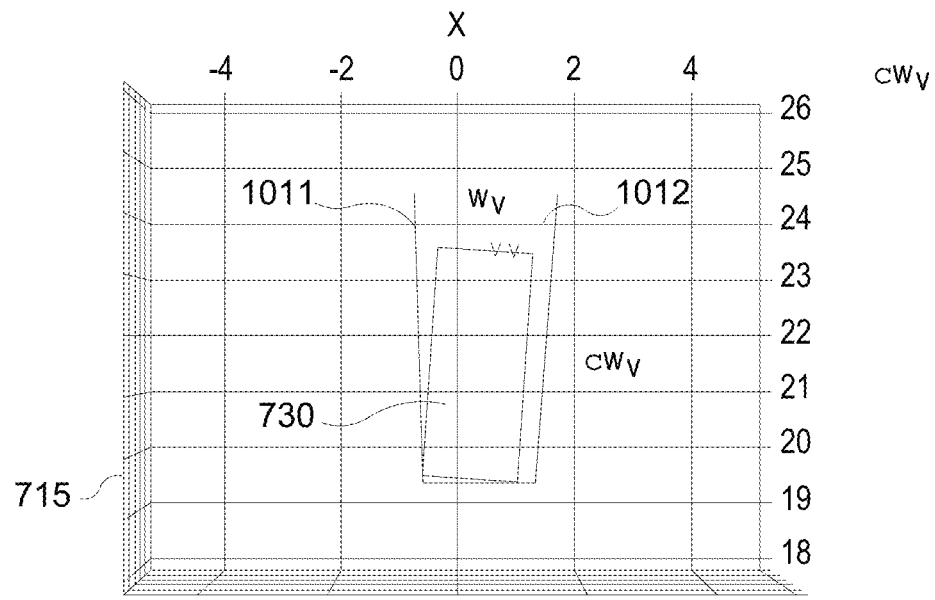
Figure 10E:
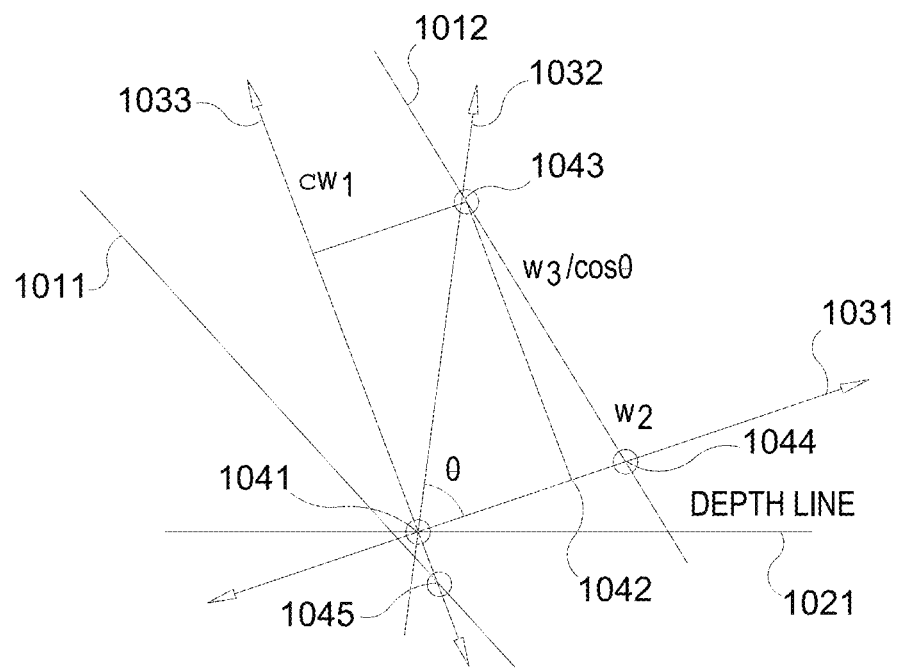

FIGS. 10C, 10D, and 10E illustrate an example implementation the vehicle position & size estimation stage 930 of FIG. 9. In FIGS. 10C, 10D, 10E, the left and right boundary lines 1011, 1012 correspond to left and right edges of the 2DBB 715. Also, in FIGS. 10C and 10E, a depth line 1021 perpendicular to the ray of vehicle depth is shown. At this juncture, the position (x, z) of the vehicle 730 (or "vehicle position") of the vehicle 730 remains to be determined. Regarding the size of the vehicle 730, while the height $h_V$ may have been determined, the width $w_V$ and length $l_V$ remain to be determined.

In an aspect, based on one or more vehicle models 1070, the aspect ratio $\alpha = l_V/w_V$ of the vehicle 730 is determined. To determine the aspect ratio $\alpha$ of the vehicle 730 (or "vehicle aspect ratio"), the system obtains a plurality of model vehicles 1070, in which the height H', width W', and length L', for each model vehicle 1070 is specified. The system may be prepopulated with the plurality of model vehicles 1070. For example, as seen in FIG. 10C, the system may be populated with three model vehicles 1070-1, 1070-2, 1070-3 (individually or collectively 1070) with respective dimensions (1.526 m, 1.629 m, 3.884 m), (2.207 m, 1.902 m, 5.078 m), and (3.252 m, 2.585 m, 10.109 m).

Based on the vehicle height $h_V$ (i.e., based on the height $h_V$ of the vehicle 730), the system selects one or more model vehicles 1070. For example, if the height $h_V$ is within a height threshold $H_{th}$ of the height of one model vehicle 1070 (e.g., $H' - H_{th} \leq h_V \leq H' + H_{th}$), that model vehicle 1070 may be selected. As another example, if the height $h_V$ is in between heights of first and second model vehicles 1070 (e.g., $H'_1 < h_V < H'_2$), those two model vehicles 1070 may be selected.

From the selected model vehicle(s) 1070, the system determines the vehicle aspect ratio $\alpha$, i.e., determines the aspect ratio $\alpha$ of the vehicle 730. For example, if one model vehicle 1070 is selected, the aspect ratio L'/W' of the model vehicle 1070 may be used as the vehicle aspect ratio $\alpha$. If multiple model vehicles 1070 are selected, e.g., if first and second model vehicles are selected, the system may interpolate the lengths and widths of the selected first and second model vehicles based on the vehicle height $h_V$ to arrive at the aspect ratio $\alpha$ of the vehicle.

Note that in FIG. 7, the 3DBB 725 visually separates the back of the vehicle 730 (corresponding to width $w_V$) from the side of the vehicle 730 (corresponding to vehicle length $l_V$) through the first and second boxes 722, 724. More specifically, the 3DBB 725 visually separates a projection of the width and length $w_V$, $l_V$ of the vehicle 730 on the 2DBB 715. The projections themselves are bounding boxes (BB). In other words, the first and second boxes 722, 724 are also bounding boxes. Based on the vehicle orientation (provided as input), vehicle aspect ratio $\alpha$ (computed), and boundary lines 1011, 1012 (computed), the system estimates a projected width BB bounding the vehicle 730 along its width $w_V$, (e.g., width of the first box 722), and estimates a projected length BB bounding the vehicle 730 along its length $l_V = \alpha w_V$ (e.g., length of second box 724).

That is, the system performs a 2D rectangle fitting, as illustrated in FIGS. 10D and 10E, by finding the width $w_V$ of the vehicle 730 (or "vehicle width") and a rectangle translation (x, z), i.e., the position of the vehicle 730 (or "vehicle position"). The 2D rectangle is initially rotated according to the orientation of the vehicle 730, and a point

1041 of the vehicle 730 is assumed to be on the depth line 1021 as shown in FIG. 10E. First, a check of six intersection points that meet between the three box lines 1031, 1032, 1033 and the boundary lines 1011, 1012 are made. Crossing points such as point 1045 below the depth line 1021 are ignored and crossing points such as points 1043, 1044 above the depth line 1021 are used to find the vehicle width $w_V$ and the translation (x, z). A minimum $w_V$ according to the candidate position of 1041 is recorded, i.e., $w_V = \min(w_1, w_2, w_3)$. The optimal point 1041 maximizing $w_V$ is found by sweeping the candidate point 1041 along the depth line 1021. The vehicle width $w_V$ and the rectangle translation (x, z) is computed from the optimal point 1041.

Figure 11:
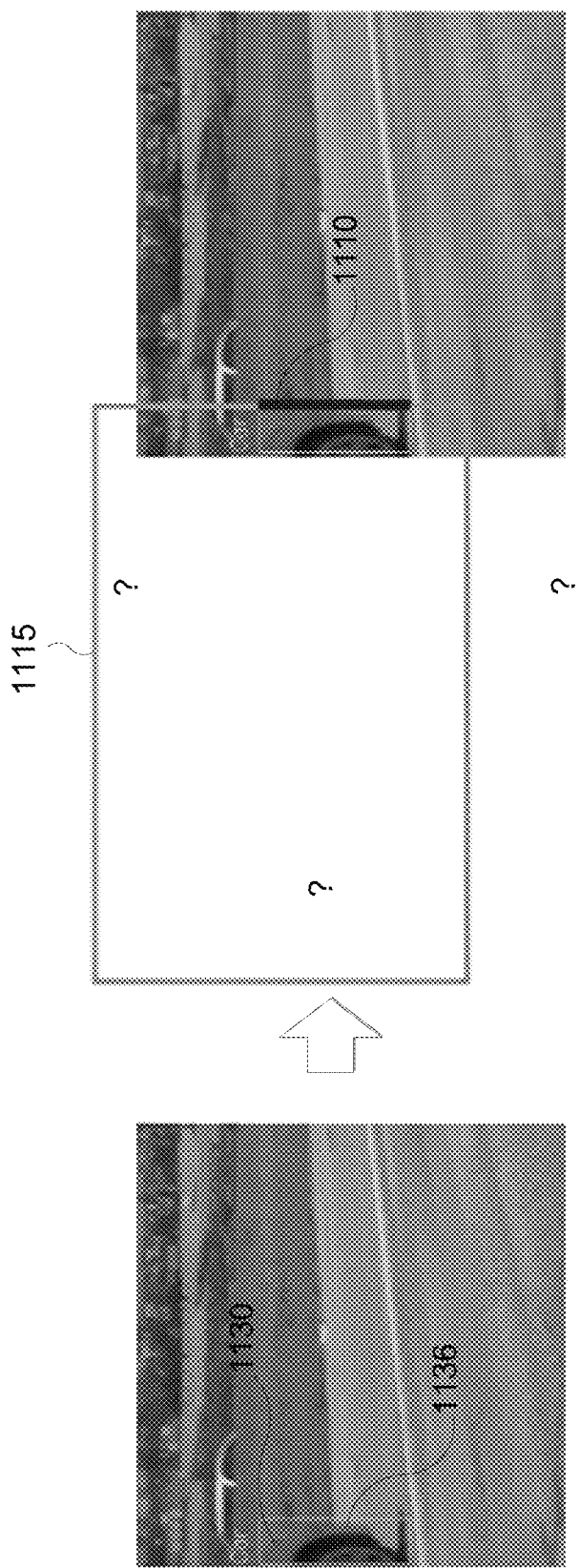
FIG. 11 illustrates an example of a partially observed 2D bounding box from which a 3D bounding box is estimated, according to various aspects of the disclosure.

Aspects of this disclosure also relate generally to single camera based vehicle 3DBB estimation from a partially observed 2D bounding box (2DBB) using lane prior information. FIG. 11 illustrates an example of a scenario being addressed. In FIG. 11, a partially observed 2DBB 1115 is shown. The length of every edge of the 2DBB 1115 cannot be estimated to be precise in size. The only clue of the bounding box 1115 is one edge 1110 corresponding to a front 1136 of the vehicle 1130. Conventional solution to estimate the 3DBB is to use other sensor data (e.g., radar, LiDAR) if possible. Otherwise, the information is ignored altogether.

However, in one or more aspects, it is proposed to estimate the 3DBB even when other sensor data are not available. It is noted that lane information is usually available for autonomous driving. For example, the lane information may be obtained from lane maps preloaded in the system. As another example, lane information may be available from the system processing prior camera frames. By utilizing the lane information, a pseudo 3DBB can be estimated.

Figure 12:
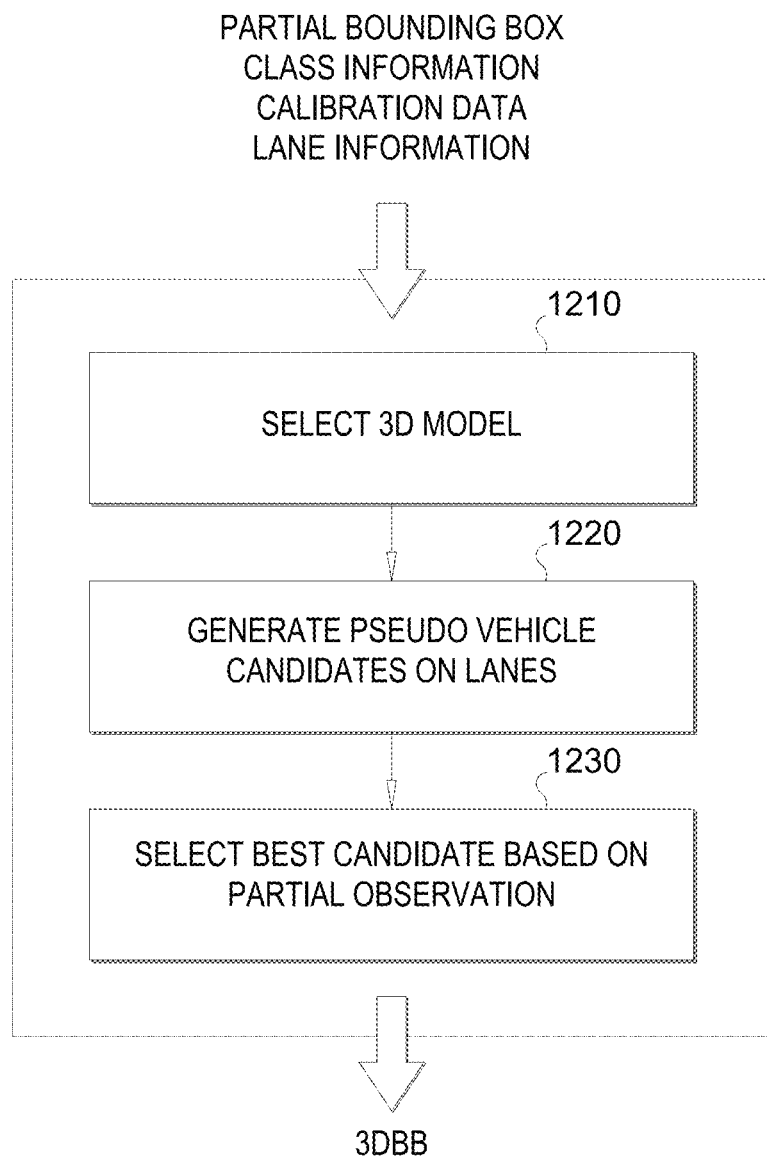
FIG. 12 illustrates example stages of a proposed technique for estimating a 3D bounding box from a partially observed 2D bounding box, according to various aspects of the disclosure.

FIG. 12 illustrates a block diagram of example stages of the proposed technique/process, e.g., performed by a system on an ego-vehicle, to estimate 3DBB from a partially observed 2DBB. The proposed technique/process includes the following stages: a model selection stage 1210, a pseudo vehicle candidate generation stage 1220, and a candidate selection stage 1230. Inputs to the proposed process include the partial bounding 2DBB, class information, calibration data, and lane information.

Figure 13A:
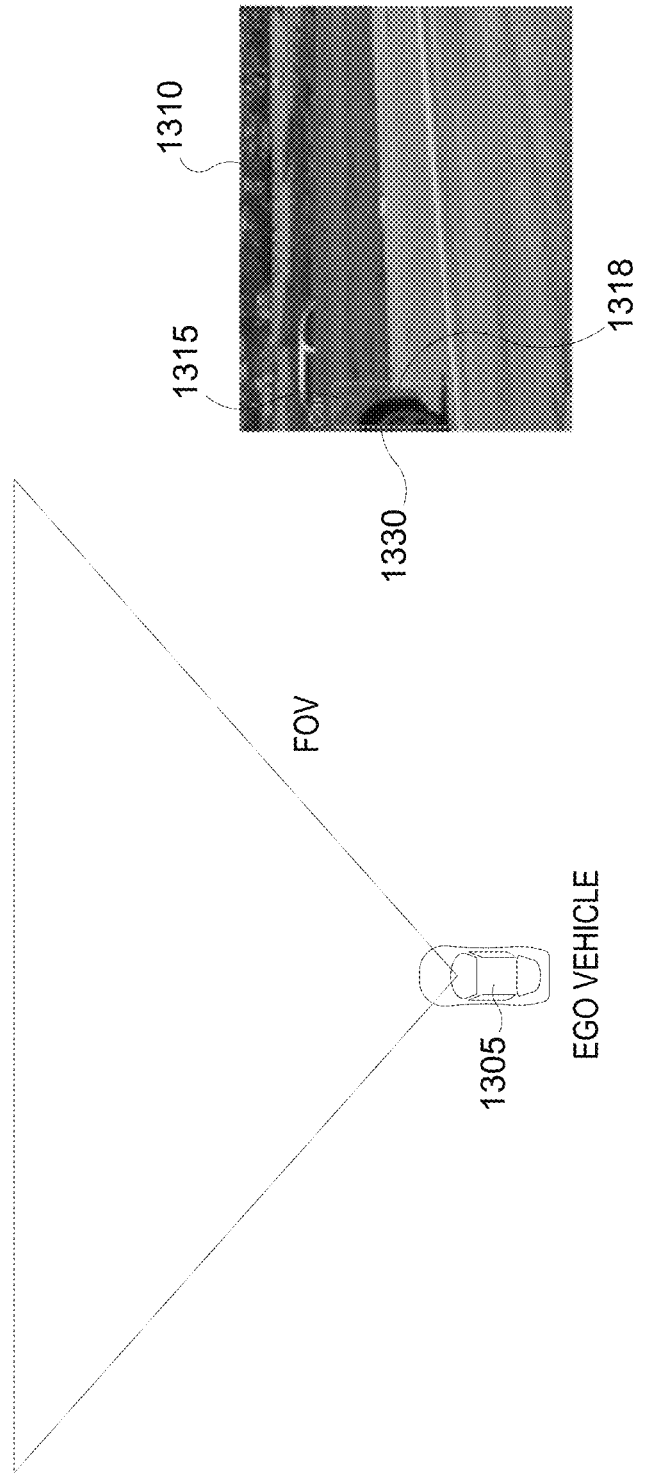
FIG. 13A-13G illustrate example implementations of stages of proposed technique for estimating a 3D bounding box from a partially observed 2D bounding box, according to various aspects of the disclosure.
Figure 13B:
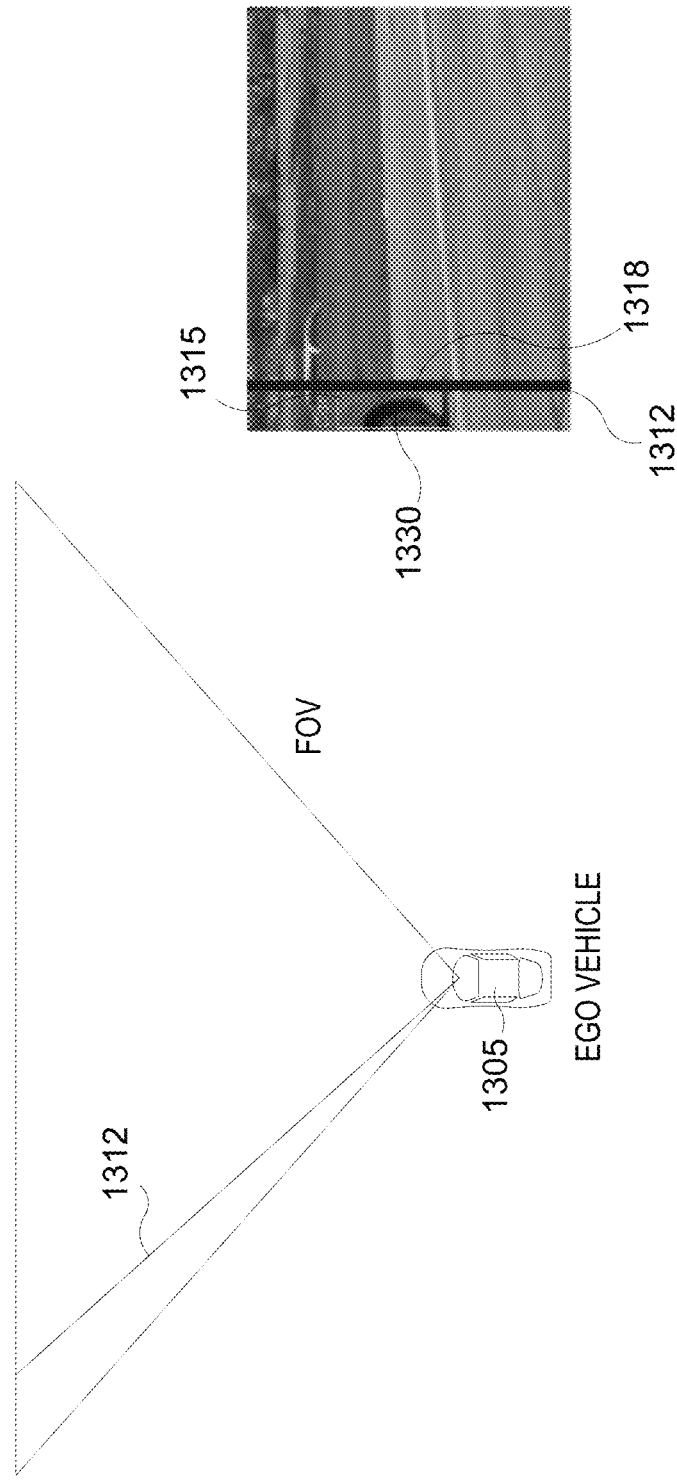
Figure 13C:
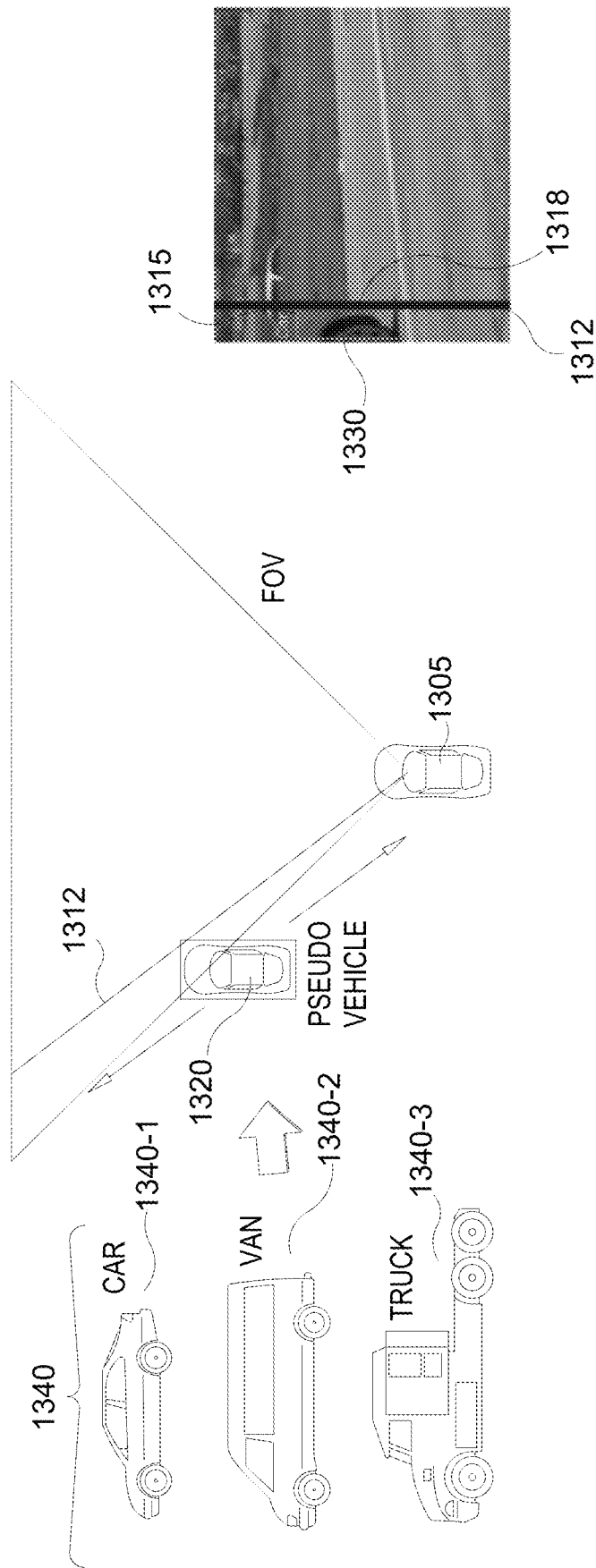

FIGS. 13A-13C illustrate example implementations of the model selection stage 1210 of FIG. 12. FIG. 13A illustrates a scenario in which only a part of vehicle 1330, which is the target vehicle, is captured in the image 1310, i.e., a camera frame 1310, captured by the camera sensor of the ego vehicle 1305. As a result, a partial bounding box (BB) 1315 associated with the vehicle 1330 is detected, generated, or otherwise determined. The partial BB 1315 may be viewed as a partial view of a 2DBB. Also, a class (e.g., car, truck, van, etc.) of the vehicle 1330 from the class information is detected based on the partial BB 1315. In this particular example, the vehicle 1330 is identified as a car. From the calibration data, a field-of-view (FOV) of the camera is also obtained. As seen in FIG. 13B, a ray 1312 intersecting a front vertical edge 1318 of the partial BB 1315 (aligned with front of the vehicle 1330) is computed. In this instance, the vertical edge 1318 may also be the front vertical edge of the 2DBB.

As seen in FIG. 13C, a pseudo vehicle 1320 is selected from a plurality of class vehicles 1340 based on the detected vehicle class. For example, the plurality of class vehicles 1340 is illustrated as including class vehicles 1340-1, 1340-2, and 1340-3 (collectively or individually 1340). First class vehicle 1340-1 represents a vehicle of a car class, second class vehicle 1340-2 represents a vehicle of a van class, and third class vehicle 1340-3 represents a vehicle of a truck class. Since the detected class of the vehicle 1330 is the car, the first class vehicle 1340-1 may be selected as the pseudo vehicle 1320. Once selected, the pseudo vehicle 1320 can be located along the ray, i.e., the depth of the pseudo vehicle 1320 is ambiguous at this juncture.

Figure 13D:
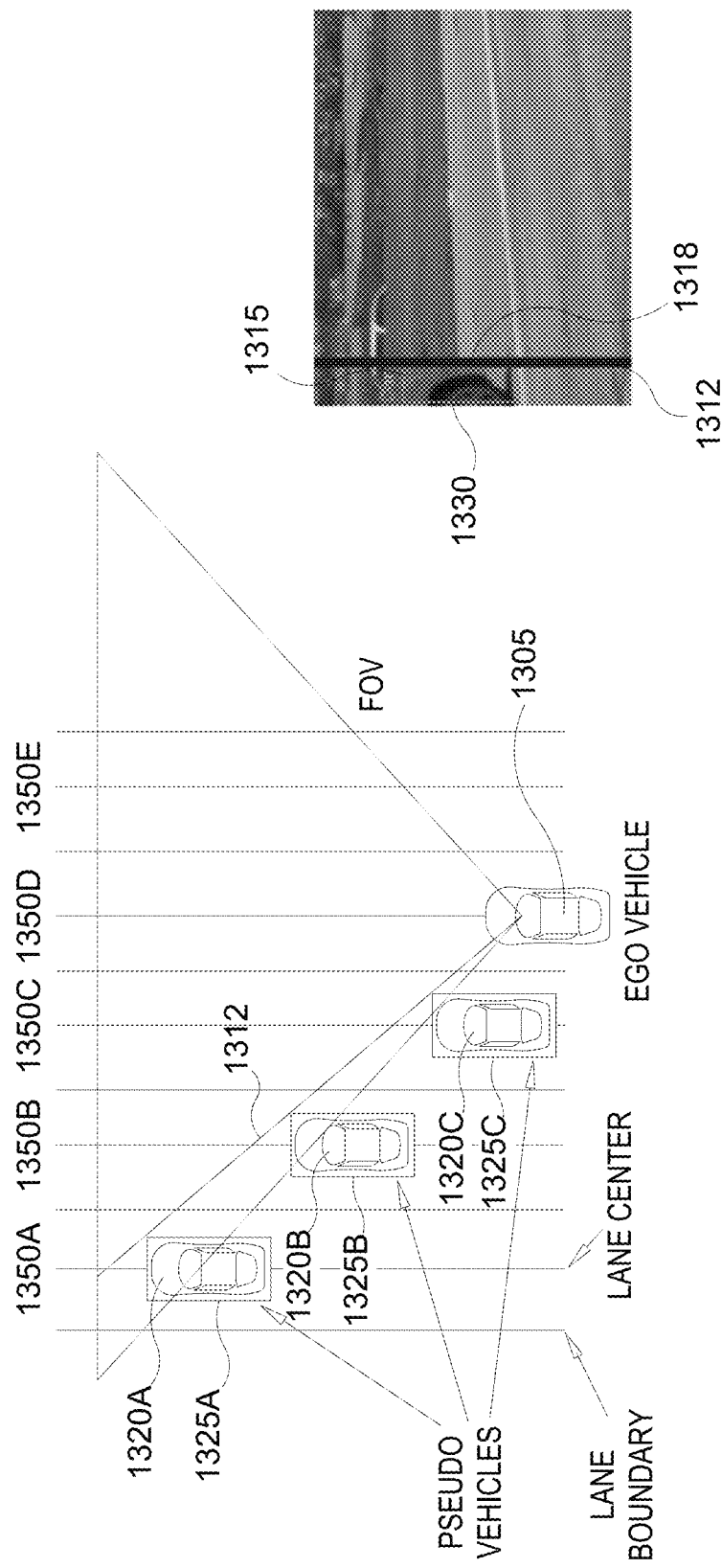
Figure 13E:
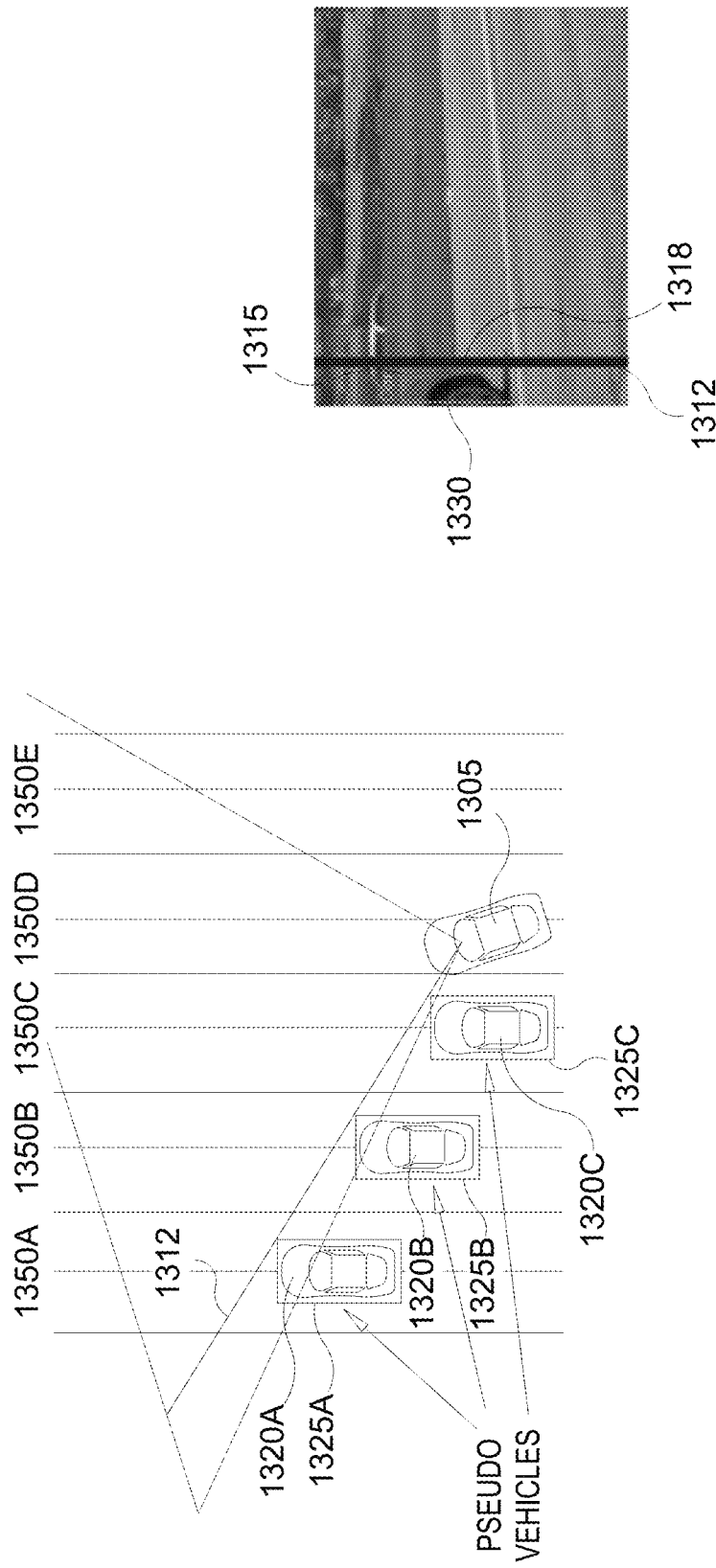
Figure 13F:
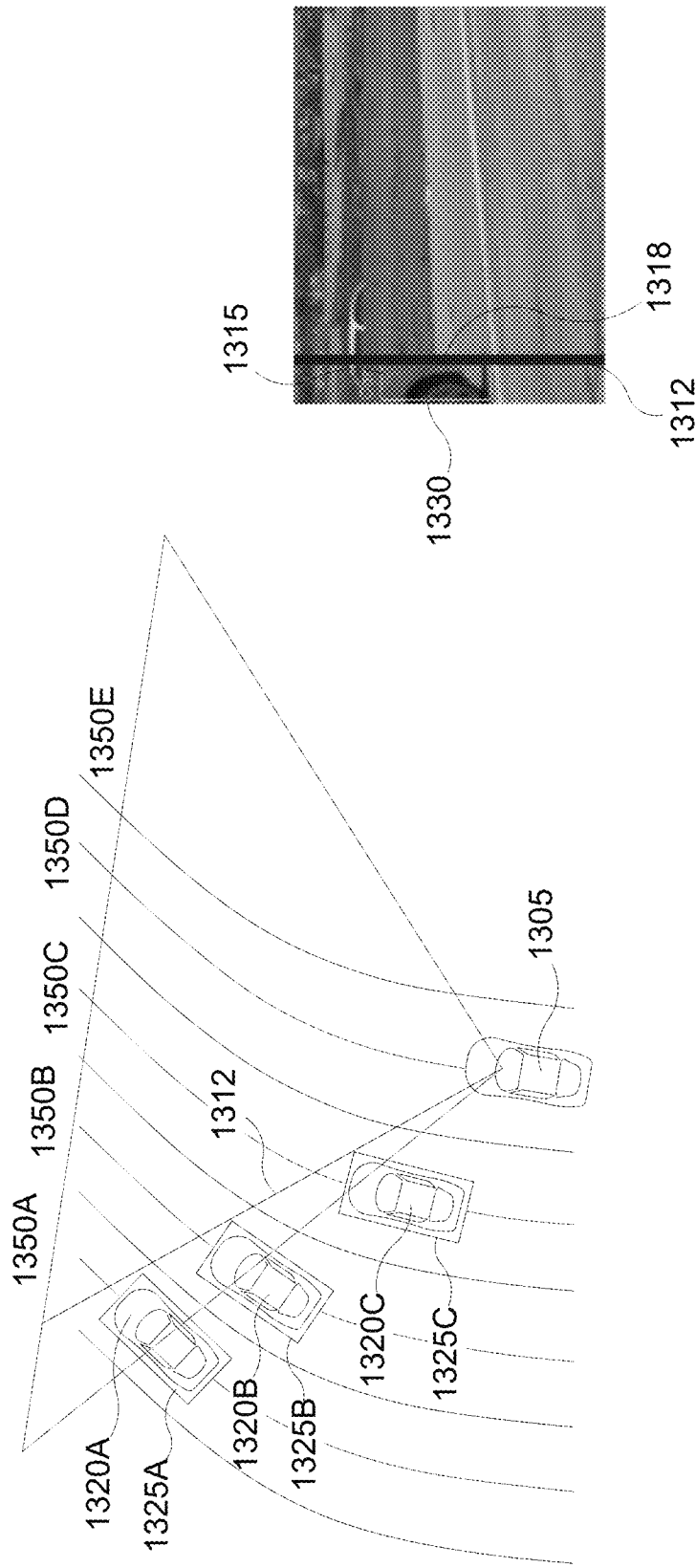

FIGS. 13D-13F illustrate example implementations of the pseudo vehicle candidate generation stage 1220 of FIG. 12. The depth ambiguity can be reduced by using the lane information (obtained through lane detection and/or from lane map). As seen in FIG. 13D, multiple pseudo vehicles (e.g., pseudo vehicles 1320A-C) and their pseudo 3DBBs (e.g., pseudo 3DBBs 1325A-C) are generated and placed in multiple lanes (e.g., lanes 1350A-E) (obtained from the lane information). For each lane 1350, the pseudo vehicle 1320 for that lane 1350 is assumed to be centered and oriented in parallel with the lane 1350. For example, the pseudo vehicle 1320A in lane 1350A is assumed to be centered and oriented in parallel with lane 1350A. As seen in FIG. 13E, a yaw difference between the ego vehicle 1305 and the orientations of the pseudo vehicles 1320 is NOT a problem. Also, when the lane geometry is known, curved lanes 1350 also do NOT present any problems as seen in FIG. 13F.

Figure 13G:
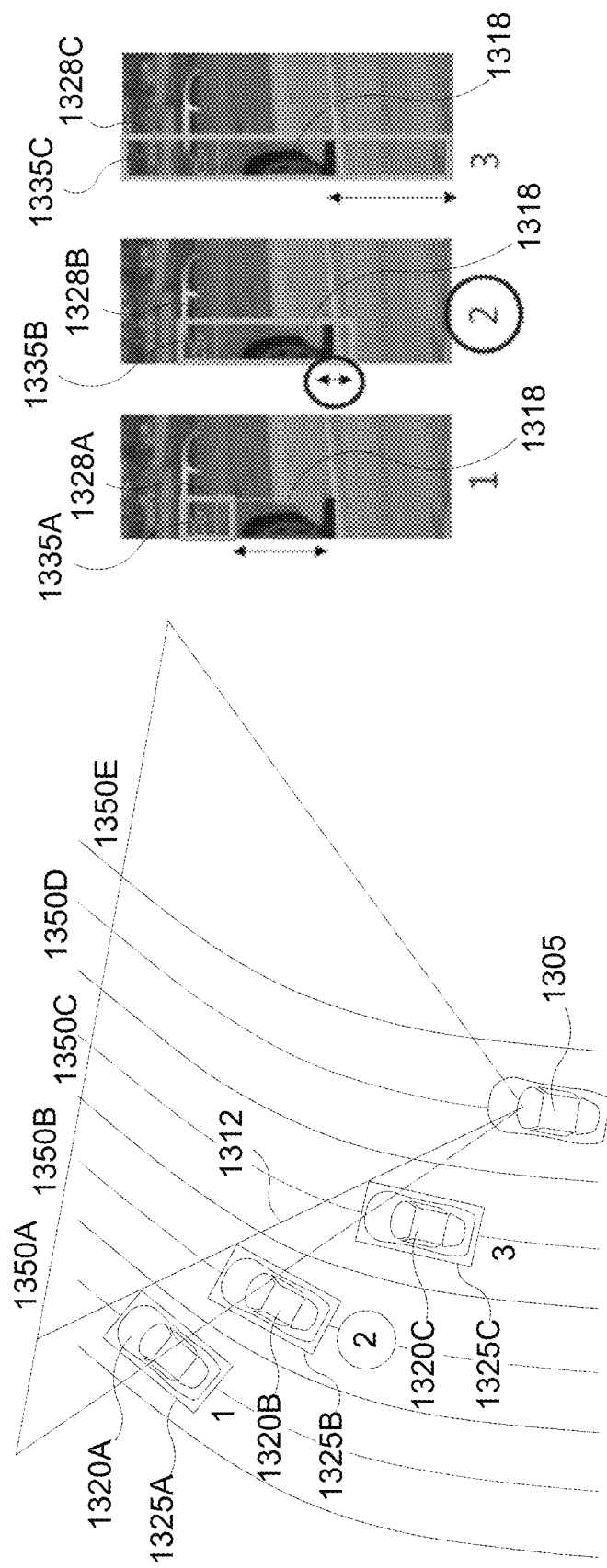

FIG. 13G illustrates an example implementation of the candidate selection stage 1230 of FIG. 12. In an aspect, the ray-touched sides of all pseudo vehicles 1320A-C are projected onto the partial view of the vehicle 1330. Then one of the pseudo vehicle (e.g., pseudo vehicle 1320B) is selected by comparing the projected edges with the detected edges. For example, each pseudo 3DBB 1325A, 1325B, 1325C (collectively or individually 1325) is projected such the vertical edge 1328A-C of the pseudo 3DBB 1325A-C is aligned with the vertical edge 1318 of the 2DBB 1315. Then for each pseudo 3DBB 1325A-C, the corresponding projected 3DBB 1335A-C is compared with the 2DBB 1315. Thereafter, one of the pseudo 3DBBs 1325A-C is selected based on the comparison. In one example, the front bottom point of the projected 3DBB 1335A-C that is the closest to the bottom point of the 2DBB 1315 can be selected. In another example, the projected 3DBB whose height (e.g., length of the vertical edge) is closest to the height of the 2DBB 1315. In FIG. 13G, it is seen that the projected 3DBB 1335B most closely matches with the 2DBB 1315. Therefore, the pseudo vehicle 1320B may be selected.

Aspects of this disclosure further relate generally to lane vehicle association to improve vehicle localization using single camera for autonomous driving. When estimating a 3DBB from a 2DBB, it is desired to localize a matched 3D vehicle that fits the projected 3DBB boundary into the 2DBB boundary. Ideally, it would be desirable to estimate the 3DBB such that the width and height of the vehicle is bounded exactly, and such that the height and length of the vehicle is also bounded exactly. That is, the first and second boxes 722, 724 would ideally bound the different sides of the vehicle exactly, or at least as close as possible.

Figure 14A:
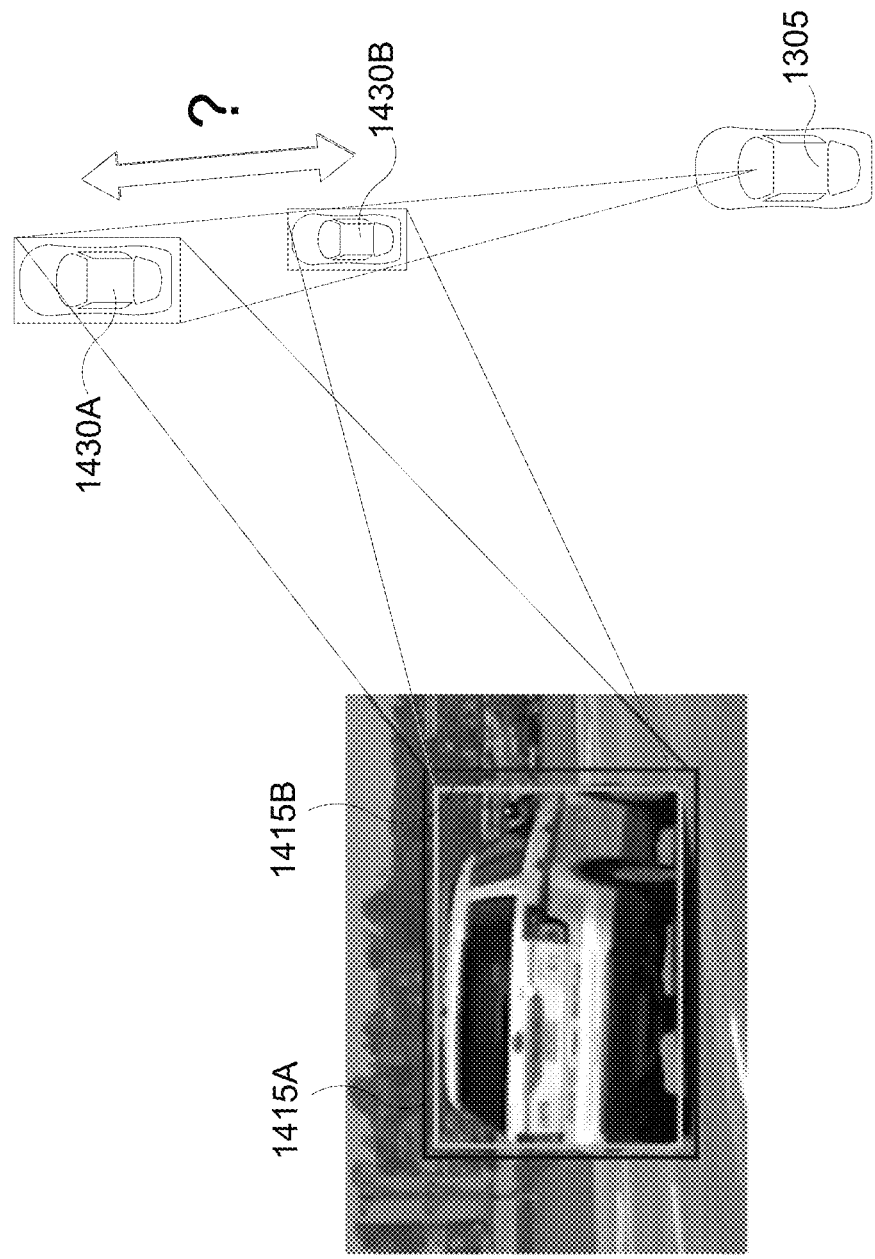
FIGS. 14A-14B illustrate an example of small measurement observational error leading to large reconstruction error when estimating a 3D bounding box from a 2D bounding box.
Figure 14B:
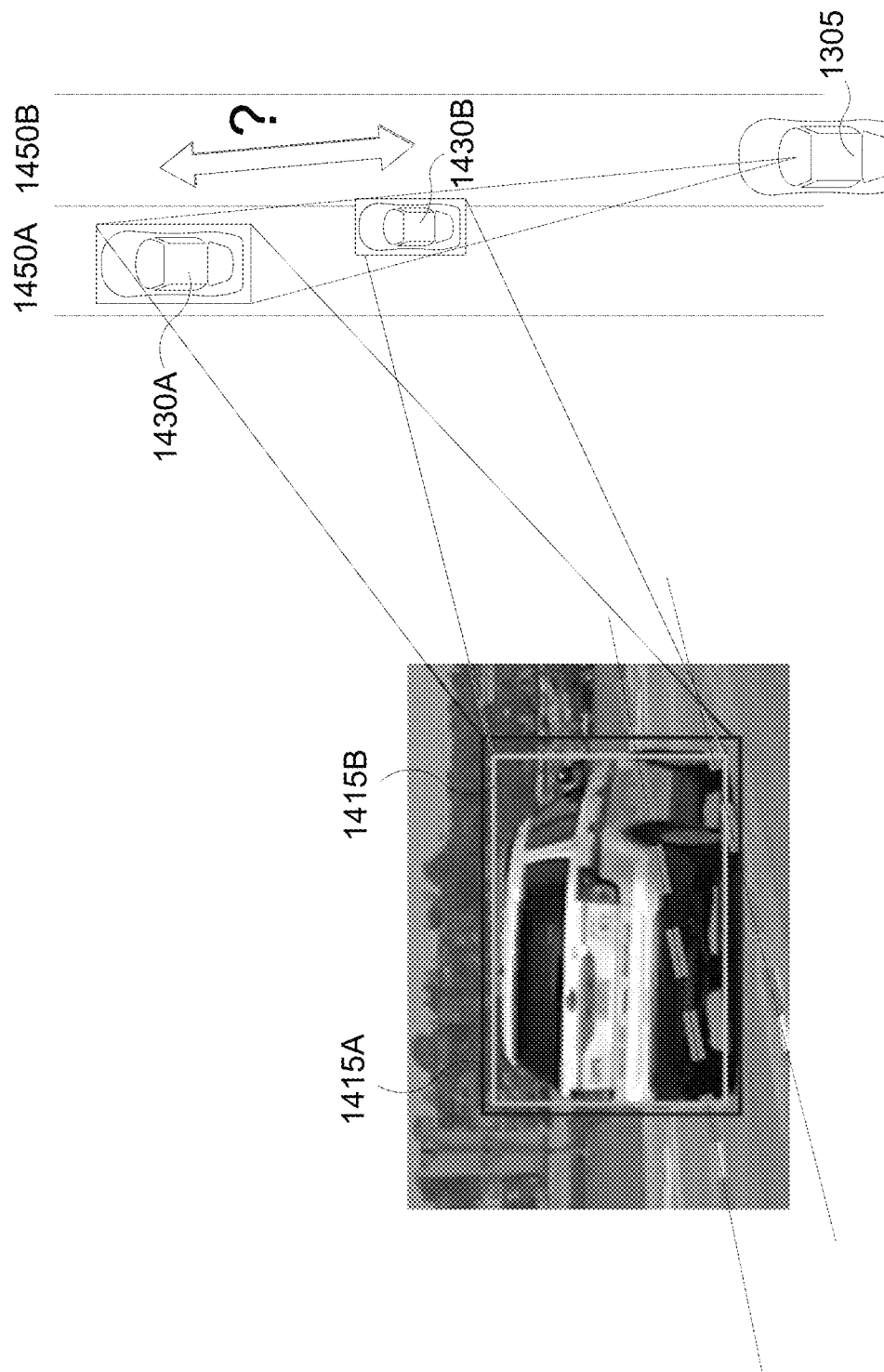

Unfortunately, single camera accurate 3DBB estimation is difficult, and large reconstruction errors can occur from small observation errors due to lack of ray directional uncertainty. This is illustrated in FIG. 14A which shows two different 2DBBs that may be generated—a larger 2DBB 1415A and a smaller 2DBB 1415B. That is, it can uncertain whether the target vehicle is the vehicle 1430A or 1430B. It is proposed to correct the ray directional uncertainty from measurement error by using 2D lane information, such as information about lanes 1450A, 1450B, as illustrated in FIG. 14B.

Figure 15:
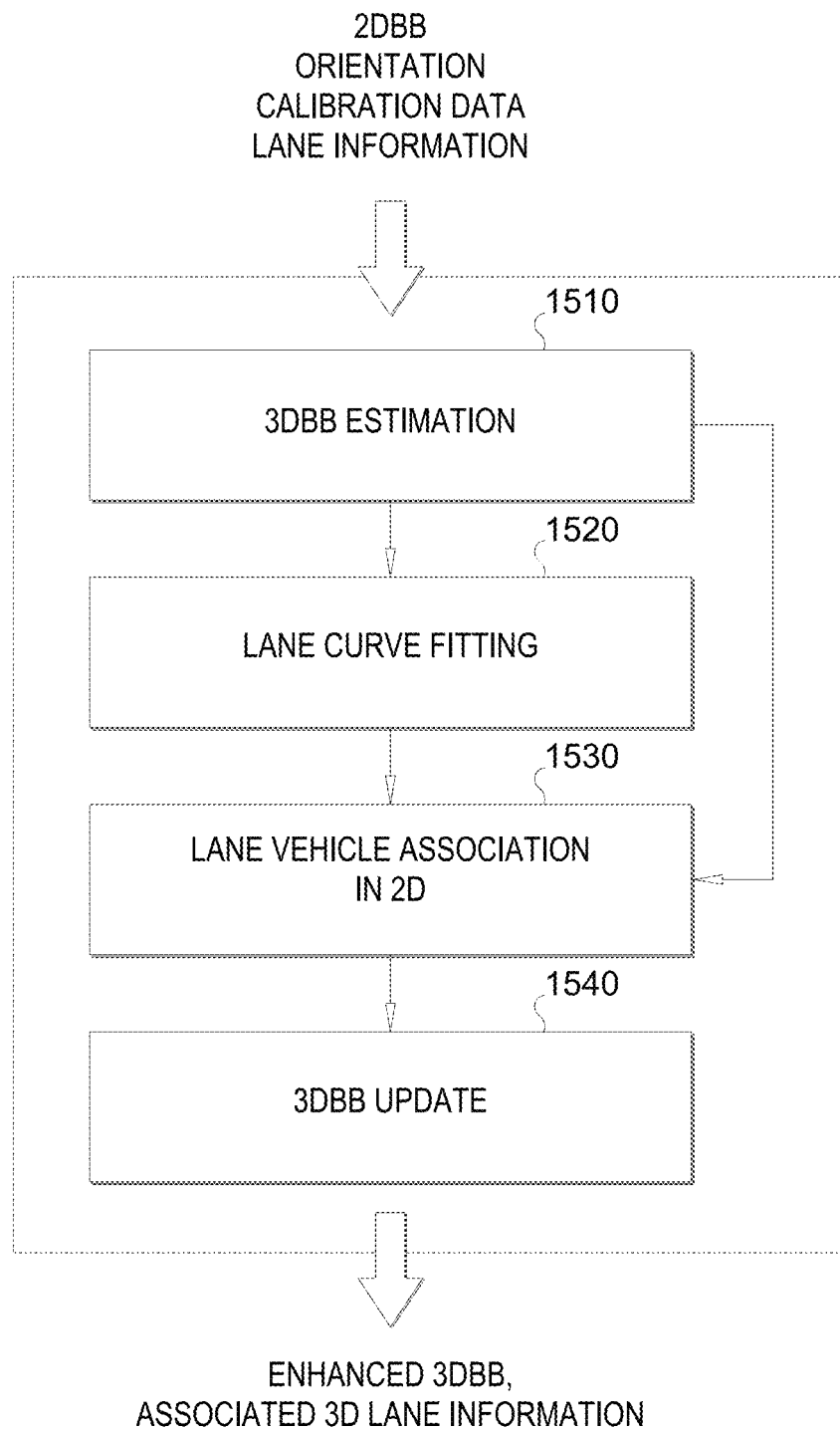
FIG. 15 illustrates example stages of a proposed technique for updating a 3D bounding box estimation using 2D lane information, according to various aspects of the disclosure.

FIG. 15 illustrates a block diagram of example stages of the proposed technique/process, e.g., performed by a system on an ego-vehicle, to update or otherwise enhance the 3DBB estimate by using 2D lane information. The proposed technique/process includes the following stages: a 3DBB estimation stage 1510, a lane curve fitting stage 1520, a lane vehicle association stage 1530, and a 3DBB update stage 1540. Inputs to the proposed process include the 2DBB, orientation information, calibration data, and lane information. Outputs of the proposed process include the updated 3DBB as well as associated 3D lane information.

Regarding the 3DBB estimation stage 1510 of FIG. 15, there are a variety of ways to generate the initial 3DBB from a 2DBB. The techniques described above with respect to FIGS. 7-10E (e.g., generating 3DBB 725 from 2DBB 715) and FIGS. 11-13G (e.g., generating 3DBB 1325 from 2DBB 1315) are examples of techniques that can be utilized to implement the 3DBB estimation stage 1510 of FIG. 15.

Figure 16A:
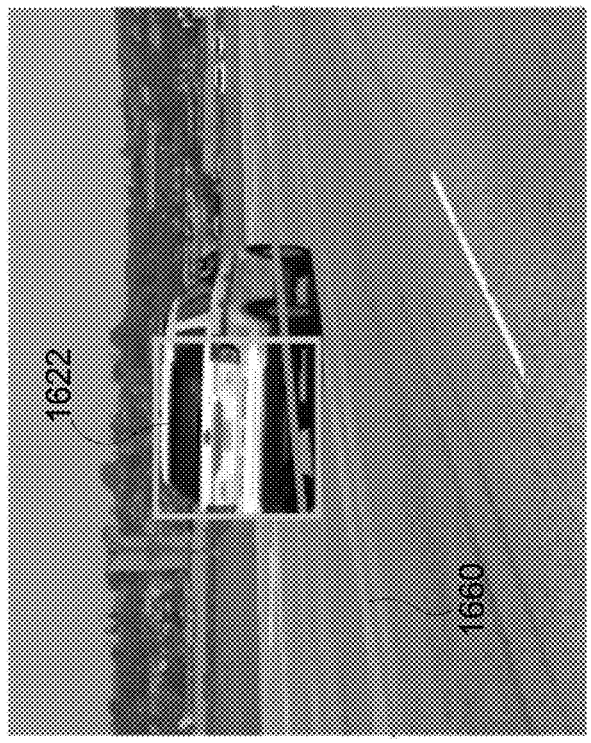
FIG. 16A-16B illustrate example implementations of stages of proposed technique for updating a 3D bounding box estimation using 2D lane information, according to various aspects of the disclosure.
Figure 16A:
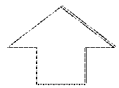
Figure 16A:
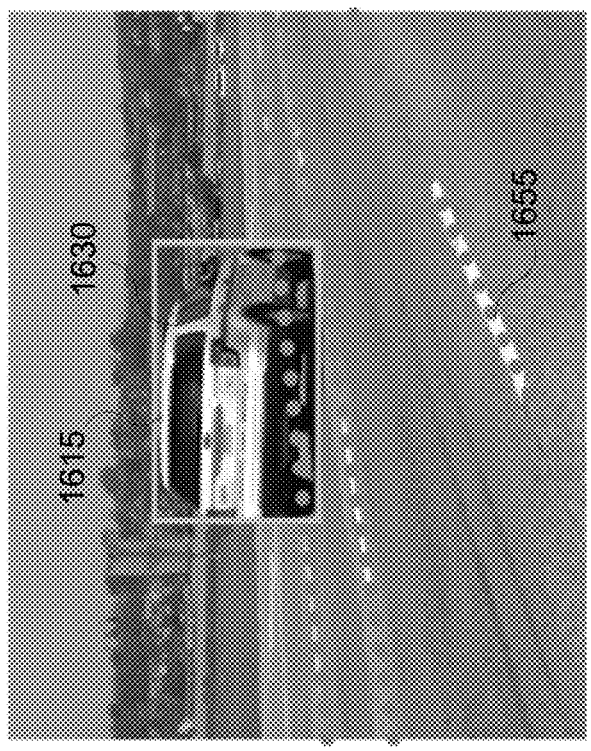
Figure 16B:
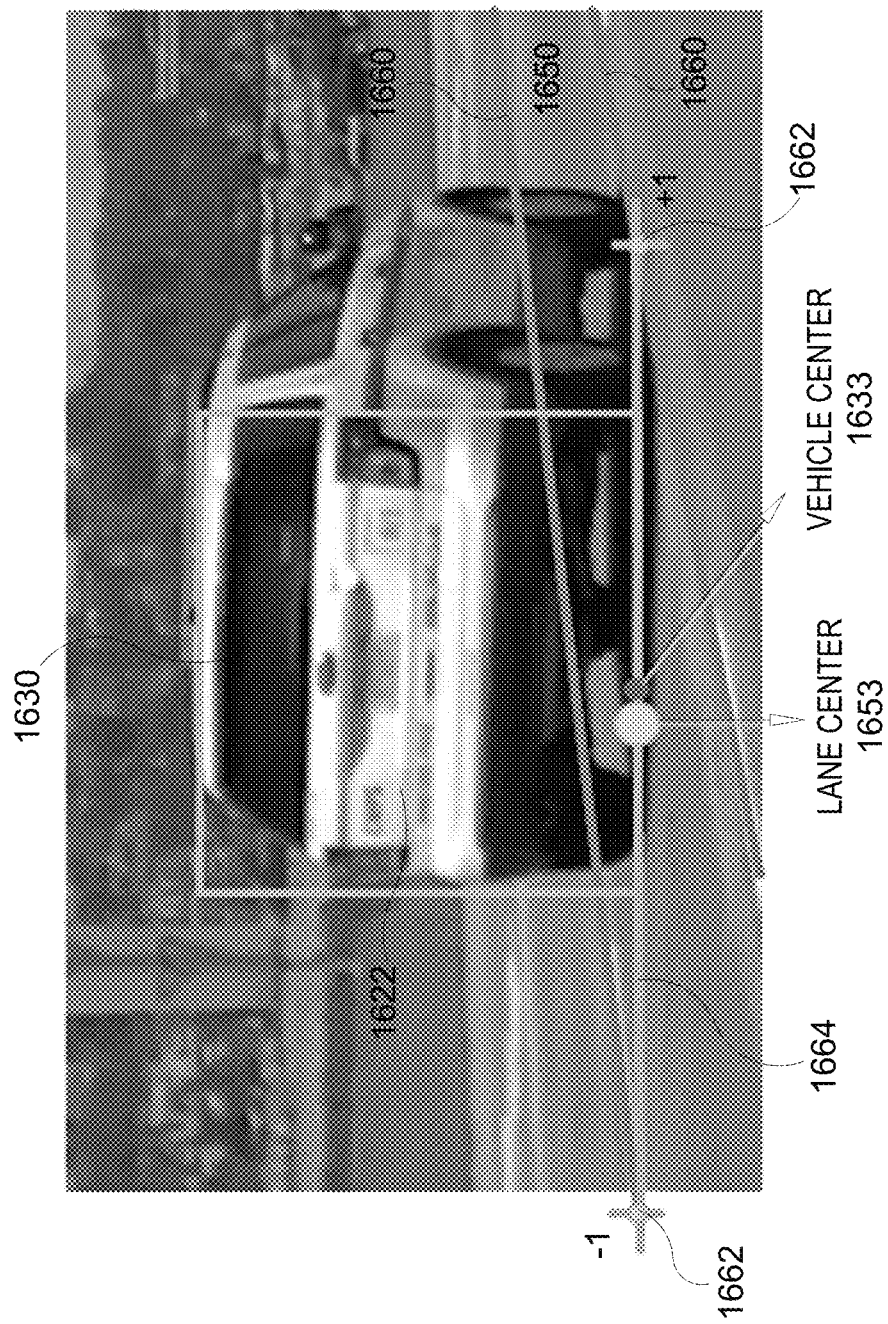

FIGS. 16A-16B illustrate an example implementation of the lane curve fitting and lane vehicle association stages 1520, 1530 of FIG. 15. At this juncture, the 2DBB 1615 and the vehicle orientation are known (provided as inputs). Also known are camera parameters such as height and tilt (from calibration data). In addition, lane vertices 1655 are obtained from lane information (provided as inputs). The lane information may preloaded in the system in lane maps and/or available from the system processing prior camera frames. As seen in FIG. 16A, basic information is extracted. For example, from the 2DBB 1615, orientation, and camera parameters, the system estimates the backface 1622 of the vehicle 1630, e.g., from the projected 3DBB. The backface 1622 may correspond to one of the boxes of the projected 3DBB. In addition, the system performs lane curve fitting on 2D lane vertices 1655 to obtain lane boundaries 1660.

As seen in FIG. 16B, the vehicle's relative position within the lane 1650 is determined. In an aspect, 2D crossing points 1662 between the lane curves (lane boundaries) 1660 and a line 1664 extended from a bottom side of the backface 1622 are determined. Then the position of the vehicle center 1633 (center of the backface 1622) relative to a lane center 1653 (midpoint of the 2D crossing points 1662) is determined.

Regarding the 3DBB update stage 1540 of FIG. 15, 3D points that correspond to the 2D crossing can be computed using a 3D lane map or 3D reconstruction of detected 2D lanes. Then the 3D depth of the vehicle can be estimated from the reconstructed 3D points and the relative position of the vehicle. Thereafter, the 3DBB estimated in stage 1510 of FIG. 15 is updated. For example, the vehicle's 3D translation and scaling are updated based on the 3D depth.

Figure 17A:
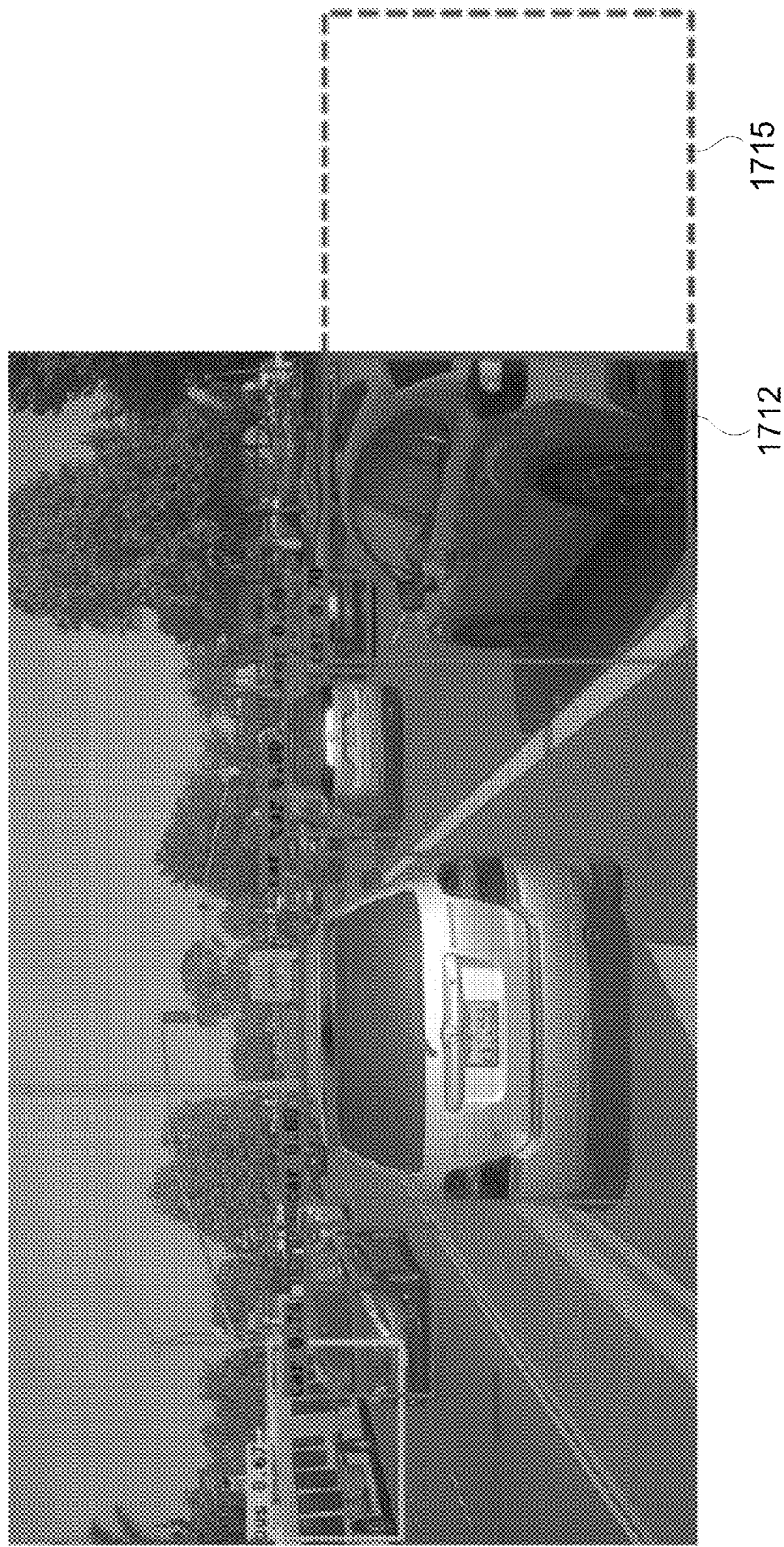
FIGS. 17A-17B illustrate examples of truncated bounding box bounding truncated object.
Figure 17B:

Aspects of this disclosure yet further relate generally to object detection at image border for autonomous driving. Bounding boxes from conventional object detection networks can be bounded by an image border for truncated objects such as vehicles. For example, as seen in FIG. 17A, truncated bounding boxes 1712 are obtained. It is desirable to derive or otherwise determine the full bounding box 1715 (dashed box). Thus, as seen in FIG. 17B, it is difficult to obtain a full bounding box 1715 when estimation from a given image is difficult.

Figure 18A:
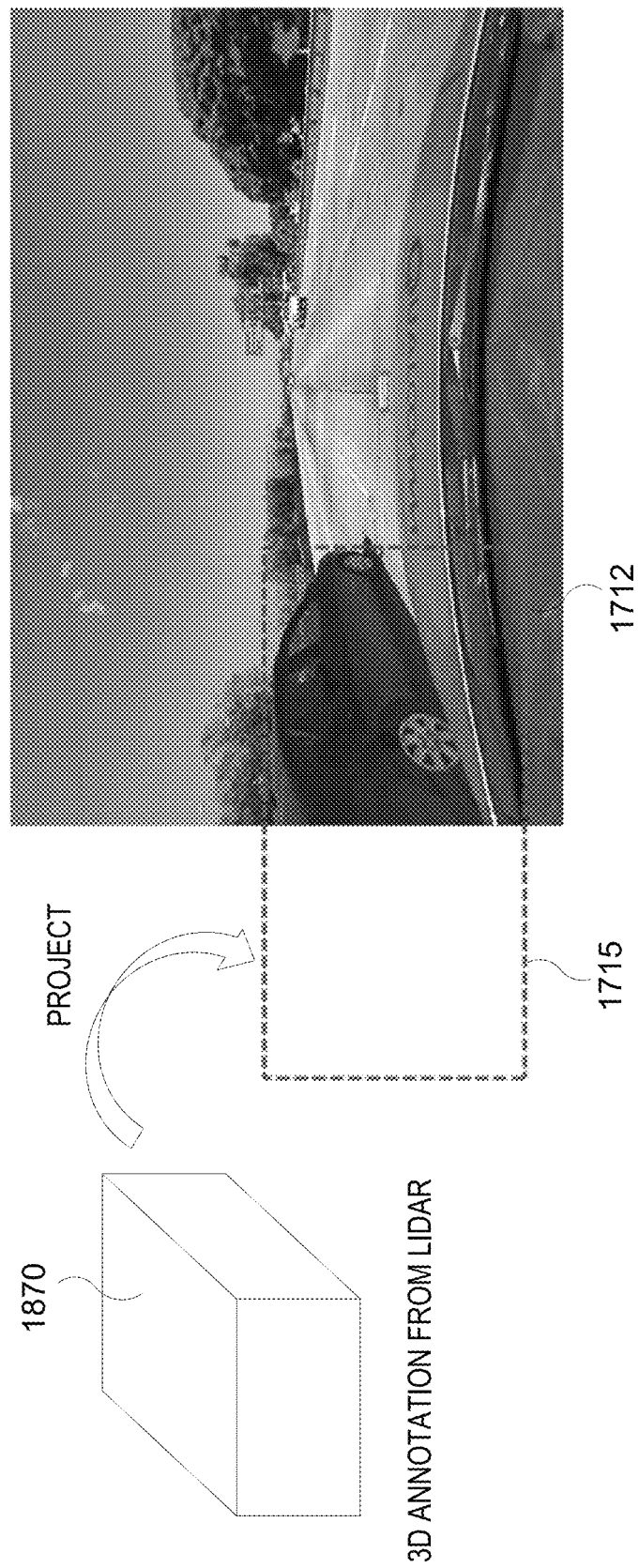
FIG. 18A-18C illustrates example implementations for training a neural network for predicting full bounding boxes of objects at image borders.

But in one or more aspects, it is proposed to predict or otherwise estimate a full bounding box 1715 (e.g., 2DBB) using a neural network (NN) trained on "out-of-image" annotation data 1870. In an aspect, the NN can be trained through stretching the bounding box annotation. For example, as illustrated in FIG. 18A, when 3D annotation data 1870 is available, 3D point clouds or 3D cuboids of the full BB are projected onto the truncated BBs. LiDAR is an example of the 3D annotation data.

Figure 18B:
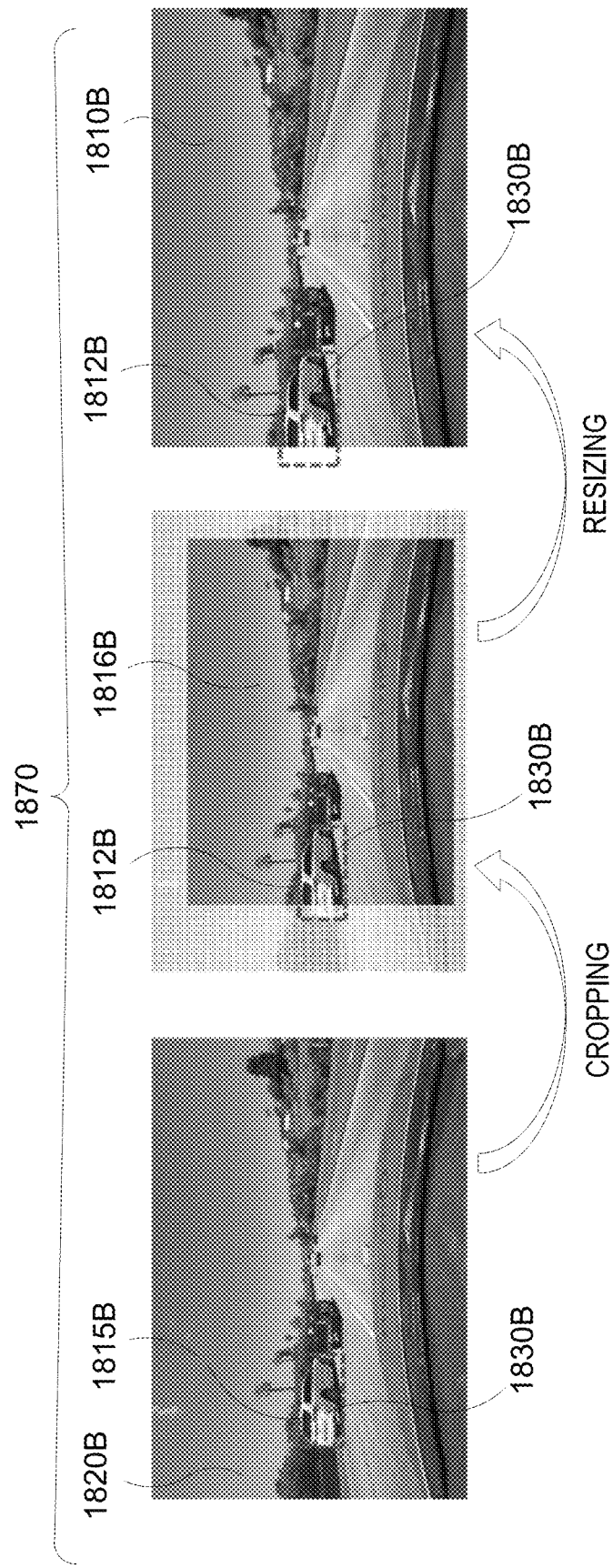

In another aspect, data may be augmented by zoom-in. For example, as seen in FIG. 18B, 2D images 1820B with full BBs 1815B may be cropped to yield a cropped images 1816B with truncated BBs 1812B corresponding to the full BBs 1815B. The cropped images 1816B may be resized into resized images 1810B. In this instance, the annotation data 1870 used in training the NN may include the resized images 1810B and images 1820B. For example, the resized images 1810B with the truncated BBs 1812B may be augmented with the 2D images 1820B with the full BBs 1815B of the same vehicles 1830B.

Figure 18C:
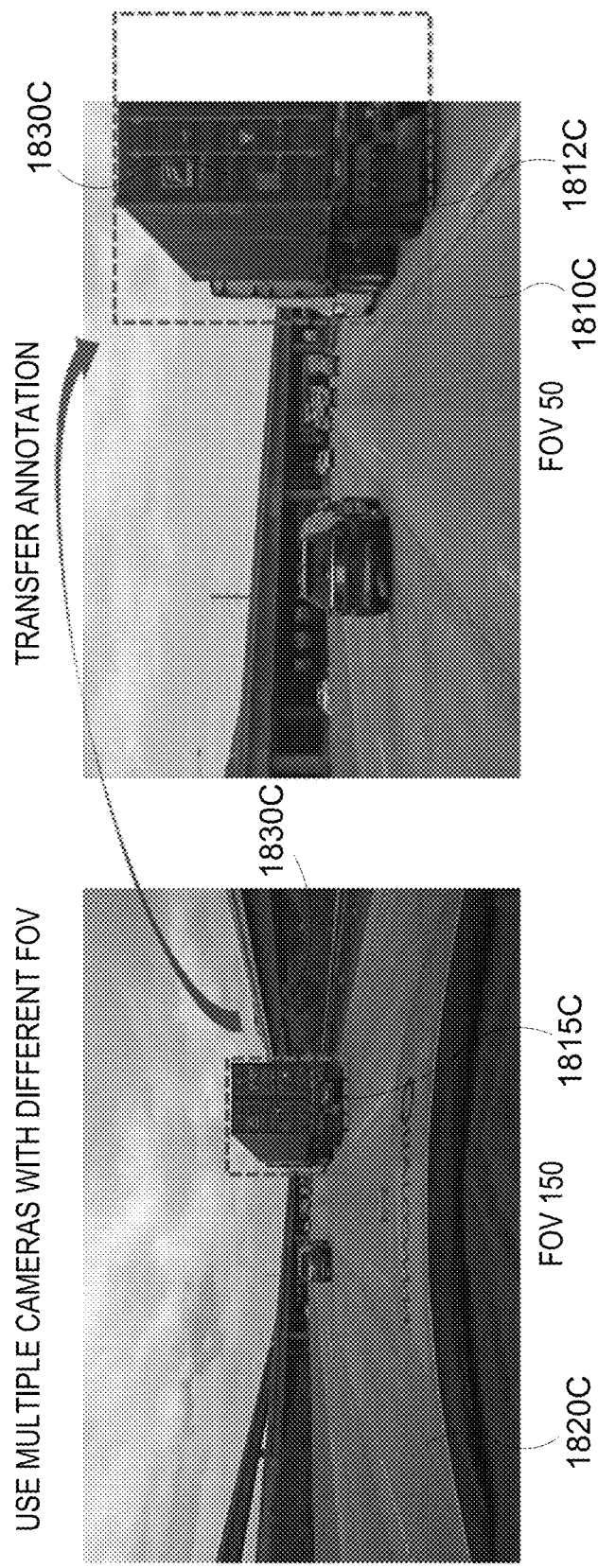

In yet another aspect, multiple cameras with different field-of-views (FOVs) may be used. As seen in FIG. 18C, same scenery may be captured with different views. For example, first images 1810C and second images 1820C of same sceneries respectively from first and second FOVs can be captured. The first images 1810C include truncated BBs 1812C and the second images 1820C include the full BBs 1815C associated with the same vehicles 1830C. In this instance, the annotation data 1870 used in training the NN may include the first images 1810C and the second images 1820C. For example, the first images 1810C with the truncated BBs 1812C may be augmented with the second images 1820C with the full BBs 1815C of the same vehicles 1830C.

Figure 19:
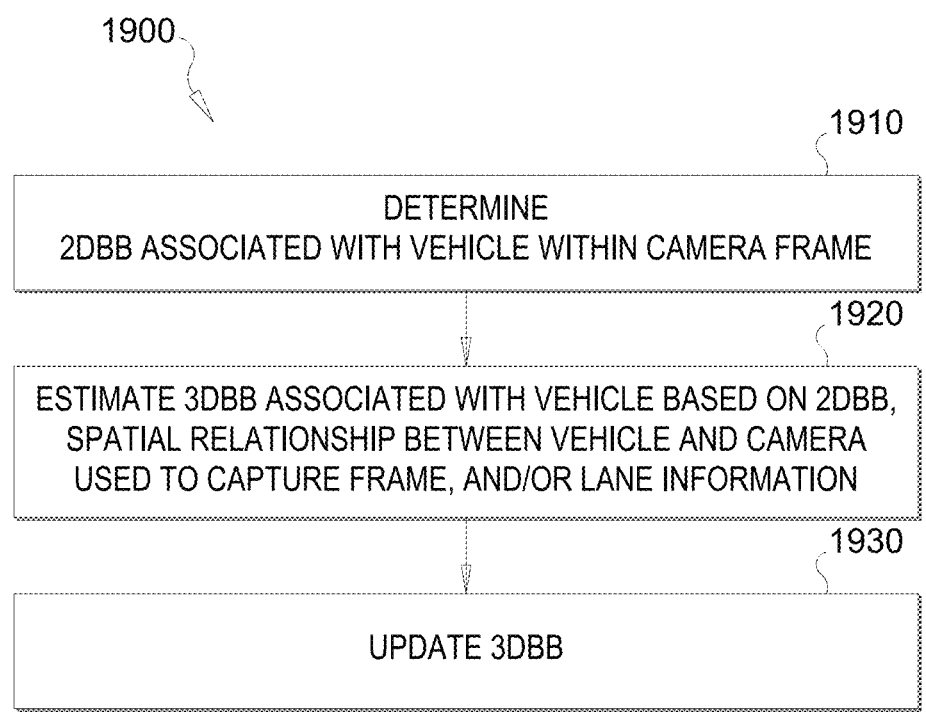
FIG. 19-23 illustrate flow charts of an example method for estimating a 3DBB from a 2DBB and updating the 3DBB, according to various aspects of the disclosure.

FIG. 19 illustrates a flow chart of an example method 1900 performed by a system, e.g., of an ego vehicle. At block 1910, the system determines a 2DBB associated with a vehicle within a camera frame. The 2DBB may bound the vehicle. In an aspect, the system may receive the camera frame captured a camera, in which the received camera frame includes at least one 2DBB bounding or otherwise associated a vehicle.

Figure 20:
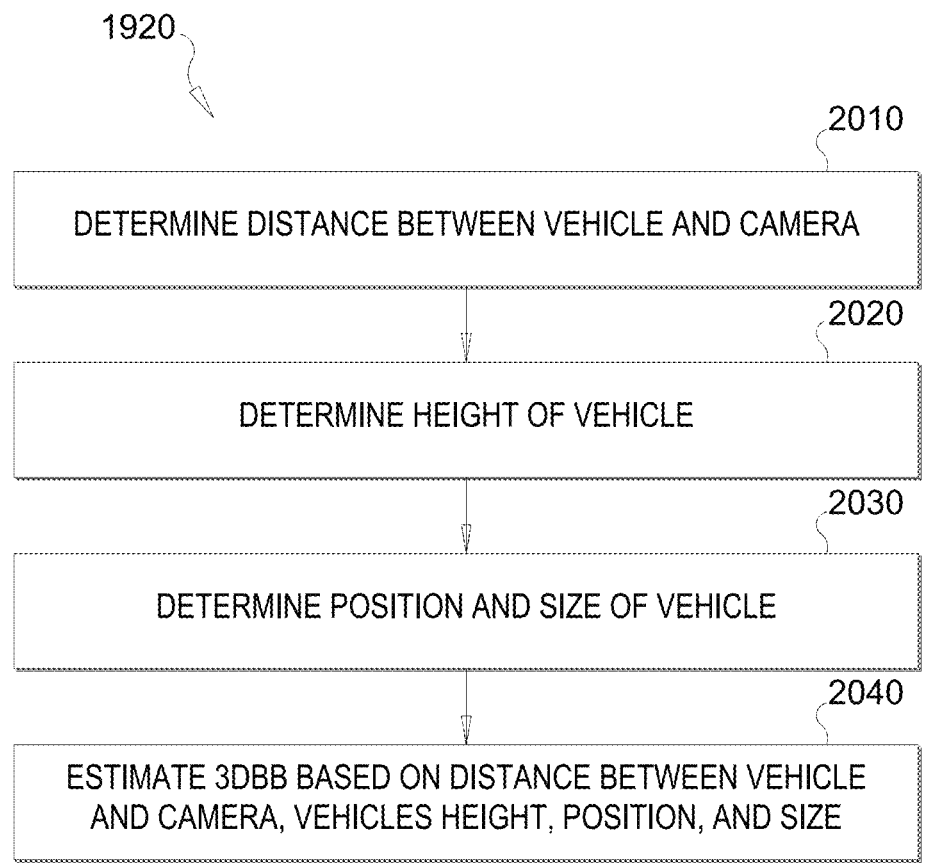

At block 1920, the system estimates a 3DBB also associated with the vehicle based on the 2DBB, the physical characteristics of the camera (e.g., height $h_V$, FOV, etc.), and/or lane information. FIG. 20 illustrates a flow chart of an example process to implement block 1920 of FIG. 19. FIG. 20 corresponds to the technique/process described and illustrated with respect to FIGS. 7-10E in which the 3DBB is estimated based on the 2DBB and on the physical characteristics of the camera. At block 2010, the system determines a distance between the vehicle and the camera used to capture the camera frame that includes the 2DBB. In other words, the system determines the vehicle distance. In an aspect, the bottom ray angle from the camera to the bottom side of the 2DBB is determined, and the vehicle distance is calculated based on the camera height and the bottom ray angle (e.g., see FIG. 10A).

At block 2020, the system determines a height of the vehicle in the camera frame. In other words, the system determines the vehicle height. In an aspect, the top ray angle from the camera to the top side of the 2DBB is determined, a gap between the camera height and the top of the 2DBB is calculated based on the top ray angle and the vehicle distance, and the vehicle height is calculated based on the camera height and the gap (e.g., see FIG. 10B).

At block 2030, the system determines the position (e.g., x, y) and size (e.g., width and length) of the vehicle in the camera frame. In an aspect, the aspect ratio of the vehicle is determined. Based on the vehicle's orientation and its aspect ratio, the vehicle width and length are determined (e.g., see FIGS. 10C-10E).

At block 2040, the 3DBB is estimated based on the vehicle's distance, height, position, and size. In an aspect, a projected width bounding box which bounds the vehicle along its width is estimated based on the vehicle orientation and aspect ratio. Also, a projected length bounding box which bounds the vehicle along its length is estimated based on the vehicle orientation and aspect ratio.

Figure 21:
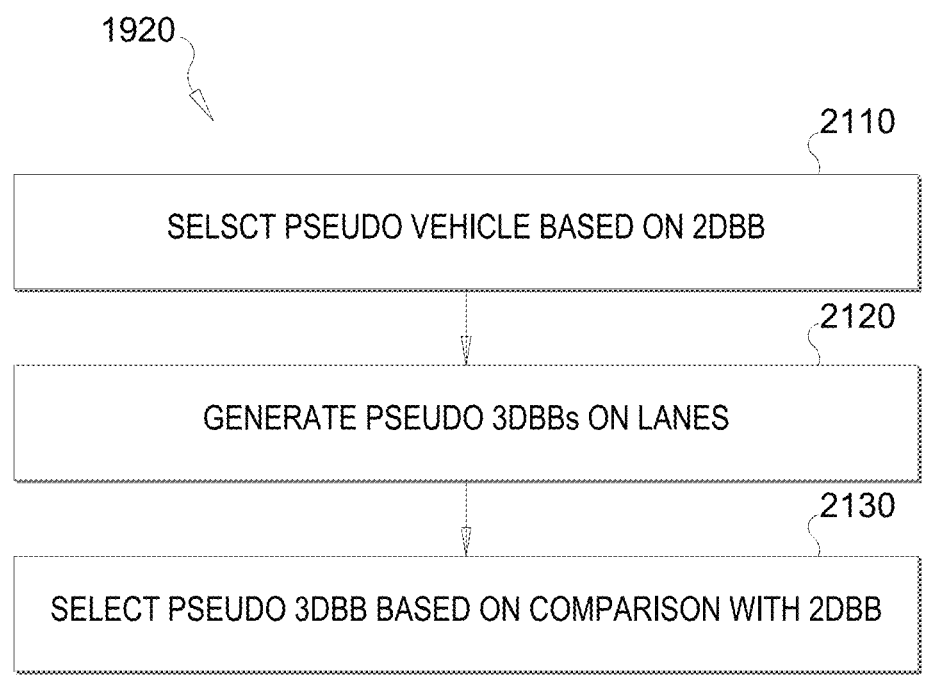

FIG. 21 illustrates a flow chart of another example process to implement block 1920 of FIG. 19. FIG. 21 corresponds to the technique/process described and illustrated with respect to FIGS. 11-13G in which the 3DBB is estimated based on the 2DBB and on the lane information. In this instance, the 2DBB is assumed to be a truncated BB in which only a partial view of the vehicle is bounded. At block 2110, the system selects a pseudo vehicle based on the partial view (e.g., see FIGS. 13A-13C). For example, the class of the vehicle can be determined from the 2DBB, and the pseudo vehicle can be selected from a vehicle class set comprising one or more vehicle classes.

At block 2120, the system generates pseudo 3DBBs on corresponding one or more lanes, in which each pseudo 3DBB is a 3DBB of the pseudo vehicle (e.g., see FIGS. 13D-13F). For example, one or more lanes are determined within the camera frame. The lanes can be determined from lane information obtained from processing prior camera frames. The lanes also can be obtained from a lane map.

At block 2130, the system selects one of the pseudo 3DBBs based a comparison of the one or more pseudo 3DBBs to the 2DBB (e.g., see FIG. 13E). For example, each pseudo 3DBB is projected such that a vertical of the projected 3DBB is aligned with the vertical side of the 2DBB. The projected 3DBBs are compared and one of the pseudo 3DBB is selected. For example, the pseudo 3DBB whose front bottom point is closest to a front bottom point of the 2DBB can be selected.

Figure 22:
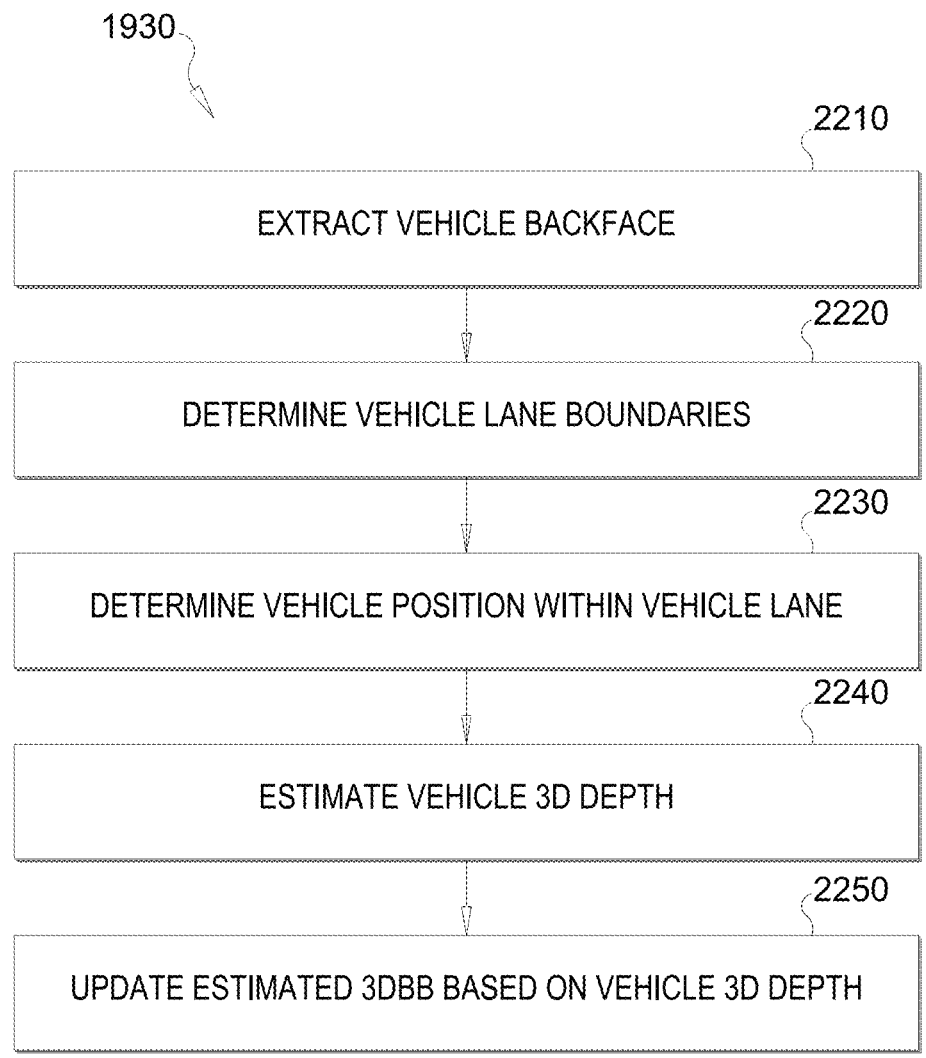

Referring back to FIG. 19, the method also comprises updating the estimated 3DBB at block 1930. FIG. 22 illustrates a flow chart of an example process to implement block 1930 of FIG. 19. FIG. 22 corresponds to the technique/process described and illustrated with respect to FIGS. 14A-16B. At block 2210, the system extracts the vehicle backface within the 2DBB (e.g., see FIG. 16A). For example, the estimated 3DBB can be projected onto the 2DBB, and the vehicle backface within the 2DBB can be extracted based on the projected 3DBB.

At block 2220, the system determines vehicle lane boundaries (e.g., see FIG. 16A). The vehicle lane boundaries are defined as the boundaries of a lane within which the vehicle is located. In an aspect, the vehicle lane boundaries are determined by performing lane curve fitting on the 2D lane vertices, which are obtained from lane information (included in a lane map or derived from processing prior camera frames).

At block 2230, the system determines the vehicle position within the vehicle lane (e.g., see FIG. 16B). For example, 2D crossing points between the vehicle lane boundaries and a line extended from the bottom of the vehicle backface are found. The vehicle position is determined as a position of the vehicle center relative to a midpoint between the 2D crossing points.

At block 2240, the system estimates the 3D depth of the vehicle. For example, 3D points corresponding to the 2D crossing points are determined. Thereafter, the 3D depth is estimated based on the 3D points and the vehicle position.

At block 2250, the system updates the estimated 3DBB. For example, the vehicle's 3D translation and scaling are updated based on the 3D depth.

Figure 23:
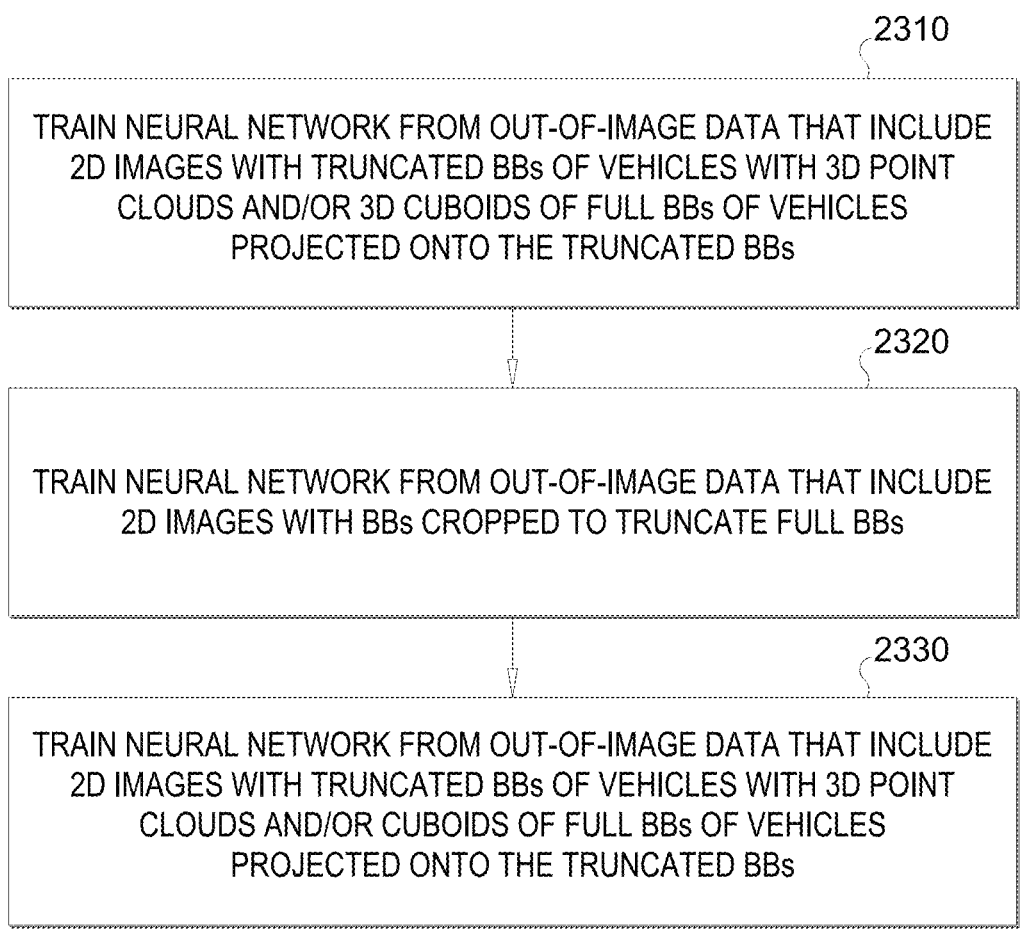

Referring back to FIG. 19, when the 2DBB is a truncated BB in which only a partial view of the vehicle in bounded, a full BB is estimated based from the truncated BB. FIG. 23 illustrates a flow chart of an example process to estimate the full BB. This may be another example of a process to implement block 1910. In an aspect, the full BB is estimated by using a neural network trained on out-of-image annotation data. FIG. 23 corresponds to FIGS. 17A-18C.

In an aspect, at 2310, the neural network is trained on out-of-image annotation data that comprises 2D images with truncated BBs of vehicles with 3D point clouds and/or 3D cuboids of a full BB of the vehicle projected onto the truncated BBs (e.g., see FIG. 18A). For example, the 3D point clouds and/or the 3D cuboids are 3D light detection and ranging (LiDAR) data.

In another aspect, at 2320, the neural network is trained on out-of-image annotation data that comprises 2D images with full BBs cropped to truncate the full BBs (e.g., see FIG. 18B).

In yet another aspect, at 2330, the neural network is trained on out-of-image annotation data that comprises 2D images with truncated BBs of vehicles augmented with 2D images of full BBs of the same vehicles from different views (e.g., see FIG. 18C).

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying the methods described herein.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. An apparatus, comprising:
   a memory; and
   a processor communicatively coupled to the memory, wherein the memory and/or the processor are configured to:
   determine a 2D bounding box (2DBB) associated with a vehicle within a camera frame;
   estimate a 3DBB associated with the vehicle based on the 2DBB and lane information, the 3DBB comprising a first box and a second box, the first box associated with a first portion of the vehicle and the second box associated with a second portion of the vehicle; and
   determine, based on the 3DBB, an autonomous or semi-autonomous driving task by an ego vehicle,
   wherein the lane information comprises information on road geometry of one or more lanes within a field of view of one or more sensors of the ego vehicle, and
   wherein the first and second boxes together bound an entirety of the vehicle.

2. The apparatus of claim 1, wherein the 2DBB bounds the entirety of the vehicle.

3. The apparatus of claim 1, wherein the first and second boxes share a common edge.

4. The apparatus of claim 1, wherein the first and the second boxes of the 3DBB are each two-dimensional.

5. The apparatus of claim 1, wherein the memory and/or the processor are further configured to continuously update the 3DBB for each camera frame of a sequence of camera frames.

6. The apparatus of claim 1, wherein the memory and the processor are further configured to update the estimated 3DBB by:
   extracting the first portion of the vehicle within the 2DBB;
   determining lane boundaries of a lane the vehicle is located within the camera frame;
   determining a position of the vehicle within the lane of the vehicle;
   estimating a 3D depth of the vehicle; and
   updating the estimated 3DBB based on the 3D depth.

7. The apparatus of claim 6,
   wherein the first portion is a backface of the vehicle, and
   wherein the memory and the processor are configured to extract the backface of the vehicle by:
   projecting the estimated 3DBB onto the 2DBB; and
   extracting the backface of the vehicle based on the projected 3DBB.

8. The apparatus of claim 6, wherein the memory and the processor are configured to determine the lane boundaries of the lane by:
   obtaining 2D lane vertices from lane information, the lane information being included in a lane map, derived from processing prior camera frames, or both; and
   lane curve fitting on the 2D lane vertices.

9. The apparatus of claim 6, wherein the memory and the processor are configured to determine the position of the vehicle within the lane by:
   determining 2D crossing points between the lane boundaries and a line extended from a bottom side of the first portion of the vehicle; and
   determining the position of the vehicle as a position of a center of the vehicle relative to a midpoint of the 2D crossing points.

10. A method, comprising:
    determining a 2D bounding box (2DBB) associated with a vehicle within a camera frame;
    estimating a 3DBB associated with the vehicle based on the 2DBB and lane information, the 3DBB comprising a first box and a second box, the first box associated with a first portion of the vehicle and the second box associated with a second portion of the vehicle; and
    determining, based on the 3DBB, an autonomous or semi-autonomous driving task by an ego vehicle,
    wherein the lane information comprises information on road geometry of one or more lanes within a field of view of one or more sensors of the ego vehicle, and
    wherein the first and second boxes together bound an entirety of the vehicle.

11. The method of claim 10, wherein the 2DBB bounds the entirety of the vehicle.

12. The method of claim 10, wherein the first and second boxes share a common edge.

13. The method of claim 10, wherein the first and the second boxes of the 3DBB are each two-dimensional.

14. The method of claim 10, further comprising:
    continuously updating the 3DBB for each camera frame of a sequence of camera frames.

15. The method of claim 10, further comprising updating the estimated 3DBB, wherein updating the estimated 3DBB comprises:
    extracting the first portion of the vehicle within the 2DBB;
    determining lane boundaries of a lane the vehicle is located within the camera frame;
    determining a position of the vehicle within the lane of the vehicle;
    estimating a 3D depth of the vehicle; and
    updating the estimated 3DBB based on the 3D depth.

16. The method of claim 15,
wherein the first portion is a backface of the vehicle, and
wherein extracting the backface of the vehicle comprises:
- projecting the estimated 3DBB onto the 2DBB; and
- extracting the backface of the vehicle based on the projected 3DBB.

17. The method of claim 15, wherein determining the lane boundaries of the lane comprises:
- obtaining 2D lane vertices from lane information, the lane information being included in a lane map, derived from processing prior camera frames, or both; and
- lane curve fitting on the 2D lane vertices.

18. The method of claim 15, wherein determining the position of the vehicle within the lane comprises
- determining 2D crossing points between the lane boundaries and a line extended from a bottom side of the first portion of the vehicle; and
- determining the position of the vehicle as a position of a center of the vehicle relative to a midpoint of the 2D crossing points.

19. An apparatus, comprising:
- means for determining a 2D bounding box (2DBB) associated with a vehicle within a camera frame;
- means for estimating a 3DBB associated with the vehicle based on the 2DBB and lane information, the 3DBB comprising a first box and a second box, the first box associated with a first portion of the vehicle and the second box associated with a second portion of the vehicle; and
- means for determining, based on the 3DBB, an autonomous or semi-autonomous driving task by an ego vehicle, wherein the lane information comprises information on road geometry of one or more lanes within a field of view of one or more sensors of the ego vehicle, and wherein the first and second boxes together bound an entirety of the vehicle.

20. A non-transitory computer-readable medium storing computer-executable instructions for an apparatus, the computer-executable instructions comprising:
- one or more instructions causing the apparatus to determine a 2D bounding box (2DBB) associated with a vehicle within a camera frame;
- one or more instructions causing the apparatus to estimate a 3DBB associated with the vehicle based on the 2DBB and lane information, the 3DBB comprising a first box and a second box, the first box associated with a first portion of the vehicle and the second box associated with a second portion of the vehicle; and
- one or more instructions causing the apparatus to determine, based on the 3DBB, an autonomous or semi-autonomous driving task by an ego vehicle, wherein the lane information comprises information on road geometry of one or more lanes within a field of view of one or more sensors of the ego vehicle, and wherein the first and second boxes together bound an entirety of the vehicle.

\* \* \* \* \*